US011055454B1

(12) United States Patent
Gasser et al.

(10) Patent No.: US 11,055,454 B1
(45) Date of Patent: Jul. 6, 2021

(54) CONFIGURING AND DEPLOYING MONTE CARLO SIMULATION PIPELINES

(71) Applicant: Amazon Technologies, Inc., Seattle, WA (US)

(72) Inventors: Timothy David Gasser, Seattle, WA (US); Ratnakar Choudhary, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 357 days.

(21) Appl. No.: 16/012,420

(22) Filed: Jun. 19, 2018

(51) Int. Cl.
  *G06F 9/455* (2018.01)
  *G06F 30/20* (2020.01)

(52) U.S. Cl.
  CPC .......... *G06F 30/20* (2020.01); *G06F 9/45558* (2013.01); *G06F 2009/45562* (2013.01); *G06F 2009/45575* (2013.01); *G06F 2009/45595* (2013.01)

(58) Field of Classification Search
  USPC ........................................................ 703/2, 5
  See application file for complete search history.

(56) References Cited

U.S. PATENT DOCUMENTS

| 6,772,136 B2 | 8/2004 | Kant et al. |
| 2008/0126024 A1 | 5/2008 | Gottsman |
| 2012/0179446 A1 | 7/2012 | Tylutki |
| 2012/0317058 A1* | 12/2012 | Abhulimen .......... G06N 3/0427 706/2 |
| 2014/0330981 A1 | 11/2014 | Sirota et al. |
| 2014/0337971 A1 | 11/2014 | Casassa et al. |
| 2017/0124492 A1* | 5/2017 | Crabtree ................. G06N 20/00 |
| 2017/0177309 A1* | 6/2017 | Bar-Or ....................... G06F 8/34 |
| 2017/0286502 A1* | 10/2017 | Bar-Or ................ G06F 16/2423 |
| 2017/0351511 A1* | 12/2017 | Bar-Or ....................... G06F 8/34 |
| 2019/0102741 A1* | 4/2019 | Gupta ................ G06Q 10/0635 |
| 2019/0188742 A1* | 6/2019 | Vasudevan ..... G06Q 10/063112 |
| 2019/0258755 A1 | 8/2019 | Minwalla et al. |

OTHER PUBLICATIONS

Non Final Office Action, U.S. Appl. No. 16/012,407, dated Aug. 31, 2020, 36 pages.

* cited by examiner

*Primary Examiner* — Thai Q Phan
(74) *Attorney, Agent, or Firm* — Nicholson De Vos Webster & Elliott LLP

(57) ABSTRACT

Techniques for performing Monte Carlo simulations within a provider network are described. A request to perform a Monte Carlo simulation is received that specifies a template identifying input parameters to the simulation. The simulation is performed in one or more virtual machines (VMs) by sampling input values from an input data distribution stored at a first network location specified in the template and by processing the sampled input values using an input parameter specified in the template to form an output distribution that is stored at a second network location specified in the template. A statistic of the output distribution is generated and sent to an electronic device.

20 Claims, 15 Drawing Sheets

US 11,055,454 B1

CONFIGURING AND DEPLOYING MONTE CARLO SIMULATION PIPELINES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators or provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the following figures.

DETAILED DESCRIPTION

Various embodiments of methods, apparatus, systems, and non-transitory computer-readable storage media for configuring and deploying Monte Carlo simulation pipelines are described. According to some embodiments, users can create a Monte Carlo simulation pipeline with the aid of a Monte Carlo simulation service offered as part of a data center operator or provider network. The Monte Carlo simulation service can then maintain the defined simulation pipeline to ensure the reproducibility of results and portability of the simulations. Further, the data center operator or provider can leverage virtualization technologies, such as those that allow multiple compute instances to share a single physical compute resource, to improve the performance of various simulation pipeline stages such as data ingestion, simulation, and results analysis.

Embodiments described herein provide several technical benefits over conventional approaches to performing Monte Carlo simulations. Traditionally, taking advantage of Monte Carlo simulation techniques required users to have cross-functional knowledge of computer science, statistics, and data sources. Further, large empirical input datasets impose significant computational performance requirements when performing Monte Carlo simulations without specialized computational resources. These challenges prevented many non-technical users from realizing the benefits of Monte Carlo simulations including the ability to solve many real-world probabilistic problems. Embodiments of the Monte Carlo simulation service described herein offload many of the technical challenges associated with performing Monte Carlo simulations to the provider network to give non-technical users the ability to run simulations with varying inputs to explore the simulation model space without investing the time to develop an in-depth understanding of the mathematics, model, and computational resources supporting the simulation. Embodiments described herein further leverage the reproducible simulation pipeline to monitor the simulation inputs and outputs relative to data representing more up-to-date data so that changes in input data to or deviations in output data from a simulation pipeline can trigger updates to the simulation pipeline. Further, deploying Monte Carlo simulation pipeline stages across compute resources within the provider network enables users to perform simulations with large empirical datasets (e.g., hundreds of gigabytes or more).

Figure 1:
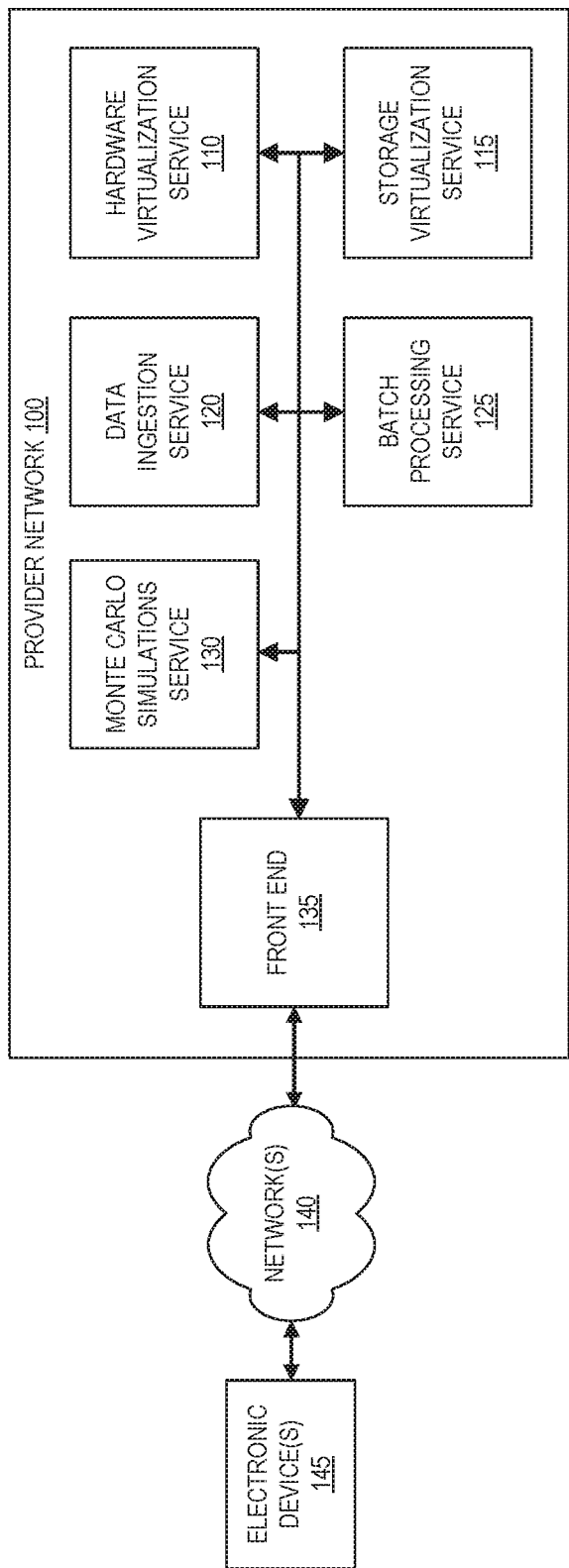
FIG. 1 is a block diagram of an illustrative operating environment in which reproducible Monte Carlo simulations are configured and performed, according to some embodiments.

FIG. 1 is a block diagram of an illustrative operating environment in which reproducible Monte Carlo simulations are configured and performed, according to some embodiments. The operating environment includes one or more electronic devices 145 in communication with a provider network 100 via one or more networks 140. Users of the electronic device(s) 145 may interact with a provider network 100 across one or more networks 140 (e.g., the internet) through a front end 135 that provides a command-line interface (CLI), website, web-based application, or other type interface. In some embodiments, the electronic device(s) 145 are part of the provider network 100.

The front end 135 interfaces to "back end" services within the provider network 100 via one or more application programming interfaces (APIs) associated with the back end service(s). Similarly, back end services interface to other back end services via APIs. In some embodiments, the front end 135 performs access control to back end services and data by verifying the identity and permissions of a user. In the present disclosure, the front end 135 provides an interface (e.g., a CLI and/or a web page) to allow the electronic device(s) 145 to interact with a Monte Carlo simulation service (MCSS) 130. The front end 135 acts as an intermediary between the electronic device(s) 145 and the back end service APIs. In some embodiments, communications between the electronic device 145 and the back end services such as the MCSS 130 are based on the HyperText Transfer Protocol (HTTP). For example, the front end 135 might receive a HTTP message from an electronic device 145 and convert the contents of the message into an API call to the MCSS 130. As described in further detail below, such calls include calls to setup a new Monte Carlo simulation pipeline, to ingest data to be used for simulations, to run simulations based on a pipeline, to check the status of running simulations, to retrieve simulation results, or to configure various input or output distribution monitoring processes to tailor the simulation to more recent data. In addition to the MCSS 130, some embodiments of the provider network 100 include a data ingestion service 120, a batch processing service 125, and other services 110 and 115 that are leveraged by the MCSS 130 as described herein.

To support the setup and execution of Monte Carlo simulations, the provider network 100 provides users with the ability to utilize one or more of a variety of types of computing-related resources such as compute resources, data/storage resources, network-related resources, application resources, etc. Compute resources include executing virtual machine (VM) instances and/or containers, executing batch jobs, executing code without provisioning servers, etc. Data/storage resources include object-level storage, block-level storage, data archival storage, etc. Network-related resources include configuring virtual networks including groups of compute and/or storage resources, content delivery networks (CDNs), Domain Name Service (DNS), etc. Application resources include databases, application build/deployment services, etc. The users of provider network 100 access computing-related resources via a user account, which may be associated with a customer account if the user is part of a multi-user organization, though the terms user and customer may be used somewhat interchangeably depending upon the context of use. As indicated above, the front end 135 performs access control based in part on the user or customer account.

To provide computing-related resources, provider networks 100 often rely upon virtualization techniques. For example, a hardware virtualization service 110 may be used to provide users the ability to control or utilize compute nodes (e.g., a VM using a guest operating system (O/S) that operates using a hypervisor that may or may not further operate on top of an underlying host O/S, a container that may or may not operate in a VM, an node that executes on "bare metal" hardware without an underlying hypervisor), where one or multiple compute nodes can be implemented using a single electronic device (e.g., a physical computer). A user may directly utilize a compute node hosted by the provider network to perform a variety of computing tasks, or may indirectly utilize a compute node by submitting code to be executed by the provider network, which in turn utilizes a compute node to execute the code (typically without the user having any control of or knowledge of the underlying compute node(s) involved). The term "compute node" may refer to a compute resource that can perform a task, such as a virtual machine, a container, a "bare metal" server device, etc. The provider network 100 or the hardware virtualization service 110 may provision compute nodes on demand (e.g., in response to receiving a request to perform a task) or in advance (e.g., pre-provisioned compute resources idle and awaiting a request to perform a task). For example, in response to receiving a request to perform a task, the provider network 100 or the hardware virtualization service 110 may provision a compute resource such as a virtual machine executing within a hypervisor environment or a bare metal compute instance that does not include a hypervisor. The virtual machine or bare metal compute instance may be launched via a machine image that includes code for performing the task or is loaded with code for performing the task after booting up. As another example, in response to receiving a request to perform a task, the provider network 100 or the hardware virtualization service 110 may assign the task to a pre-provisioned compute resource that can handle a variety of tasks (e.g., by executing containers having the code for performing a task). Each compute resource may encompass one or more underlying physical compute resources (e.g., processors, memory, etc.). The provider network 100 or hardware virtualization service 110 may manage the underlying physical compute resources as a cluster having a master node and a plurality of worker nodes, each worker node performing a portion of a task assigned to the cluster as coordinate by the master node.

A storage virtualization service 115 may be used to provide users with non-volatile data stores. A "data store" may refer to a device or combination of devices capable of storing, accessing, and retrieving data, which may include any combination and number of data servers, databases, data storage devices and data storage media, in any standard, distributed or clustered environment. Such data stores may be block-based storage (e.g., to provide a storage volume to a compute instance), object-based storage (e.g., to serve as a source for input data and destination for output data), or to support more advanced application level storage solutions such as database applications and the like. Further, a physical computer hosting compute instances may be coupled to data stores via a network or, if the data store is located within the same physical computer, via a communication bus. In some embodiments where the data store is coupled to an electronic device providing compute resources via the provider network 100, the data store data is identified by a location within the network, for example using a Uniform Resource Indicator (URI). As described below, one or more of the data stores described herein, such as a code data store 210, a template data store 220, a raw data store 310, an input distributions data store 315, a task history data store 320, and an output distributions data store 415, may be provided via storage virtualization service 115. These data stores generally represent data stores with the functions as described herein, and may be separately allocated for different users or customers using the same or different data/storage resources within the provider network 100. In some embodiments, one or more of these data stores may be located outside of the provider network 100 such as at a location within a customer's network (not shown) that is in communication with the provider network 100.

Each of the front end 135, the MCSS 130, the data ingestion service 120, the batch processing service 125, the hardware virtualization service 110, and the storage virtualization service 115 may be implemented by one or more electronic devices. Each of the one or more electronic devices include a processing unit, a network interface, and a computer-readable media in communication via one or more communication busses. The computer-readable media can include volatile and non-volatile media, such as for storing code and/or instructions that, when executed by the processing unit, allow the electronic device to perform its functions as described herein.

Figure 2:
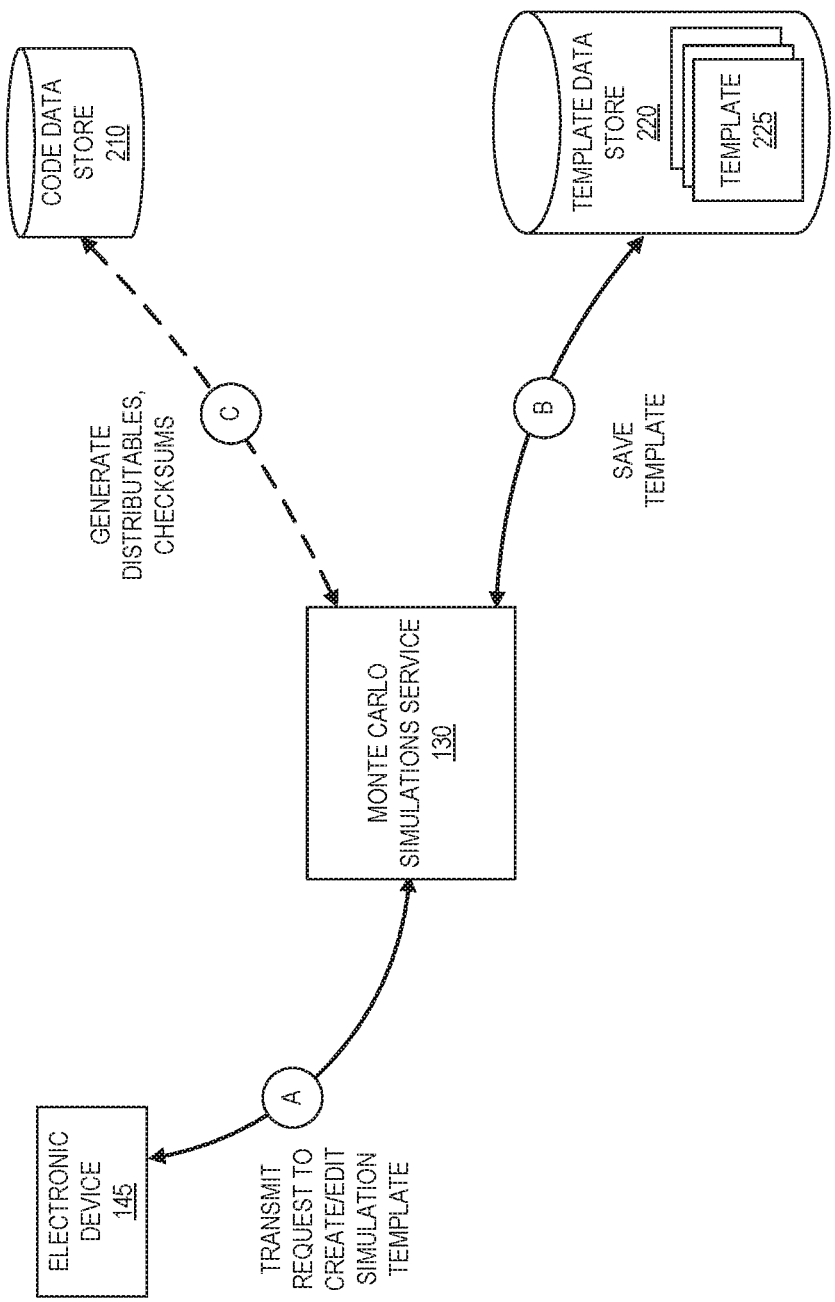
FIG. 2 is a block diagram of the operating environment of FIG. 1 illustrating the operations performed by the components of the operating environment to create and/or configure a reproducible Monte Carlo simulation pipeline, according to some embodiments.

FIG. 2 is a block diagram of the operating environment of FIG. 1 illustrating the operations performed by the components of the operating environment to create and/or configure a reproducible Monte Carlo simulation pipeline, according to some embodiments. The MCSS 130 allows users to create, configure, and modify simulations via simulation templates. In some embodiments, a "template" refers to a collection of input parameters that can be used to reproducibly perform a Monte Carlo simulation. The MCSS 130 maintains templates 225 to ensure the reproducibility of the simulation pipeline. In some embodiments, the MCSS 130 uniquely identifies each template by a template identifier.

The number and type of input parameters within a template 225 may vary from simulation to simulation, subject to the specific simulation details. In some embodiments, a template 225 includes input parameters relating to what can be generally be divided into three phases of a Monte Carlo simulation pipeline: data ingestion, simulation, and results analysis. Exemplary template 225 input parameters include the following parameters (not all of which are required).

Location of data ingestion code. This location may be specified via a URI or other address associated with a storage device within or accessible to the provider network 100. This code performs the data ingestion stage of the pipeline to process the raw input data into input data distributions used by the Monte Carlo simulation. In some embodiments, the template input parameter further specifies a particular version of the data ingestion code.

Location of Monte Carlo simulation code. This location may be specified via a URI or other address associated with a storage device within or accessible to the provider network 100. This code performs the simulation stage of the pipeline to perform a Monte Carlo simulation that receives as inputs data from the input data distributions and other template parameters and generates an output distribution. In some embodiments, the template input parameter further specifies a particular version of the Monte Carlo simulation code.

Location of simulation analysis code. This location may be specified via a URI or other address associated with a storage device within or accessible to the provider network 100. The code performs the analysis stage of the pipeline to analyze the results of the simulations (e.g., output distributions) to generate summaries. In some embodiments, the template input parameter further specifies a particular version of the simulation analysis code.

Location of raw input data. This location may be specified via a URI or other address associated with a storage device within or accessible to the provider network 100. The raw input data is typically large amounts of empirical data stored in a machine-readable format (e.g., SQL or NoSQL databases, eXtensible Markup Language (XML), JavaScript Object Notation (JSON), compressed or uncompressed ASCII data (e.g., log files), etc.).

Location to store input data distributions. This location may be specified via a URI or other address associated with a storage device within or accessible to the provider network 100. This location is where the data ingestion code is to store the processed raw input data in the form of empirical input distributions that are sampled for inputs in Monte Carlo simulations.

Location to store output data distributions. This location may be specified via a URI or other address associated with a storage device within or accessible to the provider network 100. This location is where the simulation code stores the generated output distributions.

A seed value used by the instructions to perform Monte Carlo simulations. The seed value is typically an integer value used to initialize a pseudorandom number generator within the Monte Carlo simulation code and is stored with the template to ensure subsequent simulations based on the template reproduce the same results.

Parametric input distribution parameters. In some Monte Carlo simulations, some inputs are sampled from parametric distributions defined from statistical parameters rather than samples from empirical data distributions. Exemplary parametric distributions include a uniform distribution over an interval (a, b), a Gaussian distribution having a mean and a variance, etc.

Pipeline control parameters. These input parameters are other parameters that control the overall simulation pipeline. For example, these parameters could specify the number and type of compute nodes to perform the data ingestion, simulation, and result analysis phases of the pipeline, such as how many processor cores are desired, how much memory is desired, whether simulation is assisted by an accelerator (e.g., a graphics-processing unit), the operating environments for the code that performs the various phases of the pipeline (e.g., particular Linux or Windows operating systems), the location of a machine image to be used to boot computing resources performing phases of the pipeline, etc.

Runtime control parameters. These input parameters are inputs that can be configured at runtime for the different phases. These input parameters are not based on an input distribution. One example of a runtime control parameter is a scaling factor to use on the input values sampled from an input distribution. Another example of a runtime control parameter is a pass/fail threshold used by the analysis algorithm to determine whether the output distribution satisfies a criterion (e.g., 99% of values in the output distribution are below the threshold). Other simulation parameters may specify the number of simulations to run, the number of iterations to perform to perform per simulation, etc. Runtime control parameters may be configured when initiating a simulation (versus editing a template). In some embodiments, only runtime control parameters are configurable when initiating a simulation. In some embodiments, the runtime control parameters include the parametric input distribution parameters to adjust the parametric distribution(s).

In some embodiments, the template includes an identifier to distinguish between each of the configurable parameters (e.g., runtime control parameters) that can be changed when initiating a simulation and any input parameters that are unavailable for modification when initiating a simulation. In some embodiments, the template includes default values for the configurable parameters. In some embodiments, a configurable parameter includes a range of acceptable input values (e.g., minimum and maximum). The configurable parameter may further include an increment value that can be used to sweep the configurable parameter from the minimum to the maximum values by the increment value (e.g., a minimum of 5, a maximum of 10, and an increment value of 1 would result in a group of simulations having the configurable parameter vary per simulation with values 5, 6, 7, 8, 9, and 10).

Returning to FIG. 2, at the encircled "A" an electronic device 145 is in communication with the MCSS 130. A front end (not shown) may handle communications between the electronic device 145 and the MCSS 130, such as the front end 135 described above. The electronic device 145 transmits a request to create a simulation template (e.g., via an API call to the MCSS 130). The request may be to create a new simulation template, to create a new version of an existing simulation template, or to edit an existing template. The request may include one or more input parameters and/or input data to be included with or referenced by the new template. The MCSS 130 and the electronic device 145 exchange communications until the required input parameters for a template are defined (e.g., via a series of requests and responses). If the request is to create a new template based off an existing template or to edit an existing template, the MCSS 130 may retrieve the existing template and send its parameters to the electronic device 145 to allow a user to make changes. Once all of the required input parameters are specified, the MCSS 130 saves the new or updated template in the template data store 220, as indicated at circle B. In some embodiments, the template data store 220 is a version-controlled storage repository provided by storage virtualization service 115.

At circle C, the MCSS 130 stores code in the code data store 210 or associates the code stored in the code data store 210. The code is to perform the data ingestion, simulation, and analysis phases of the Monte Carlo simulation pipeline. The code data store 210 is one or more network storage locations identified by the input parameters specifying the locations of the code to perform the data ingestion, simulation, and analysis phases of the Monte Carlo simulation pipeline. In some embodiments, the code data store 210 is a version-controlled storage repository provided by storage virtualization service 115. In some embodiments, the MCSS 130 generates or builds executable binaries, machine images, containers, or other types of software bundles based on source code specified in the template. These software bundles can be distributed to and executed by computing resources in the provider network 100. Such computing resources may be dynamically allocated to perform stages of the Monte Carlo simulation pipeline by the MCSS 130 or via the hardware virtualization service 110, as described below. In some embodiments, the MCSS 130 obtains a checksum or version information of one or more of the generated software bundles and stores the checksum as parameters in the template.

Figure 3:
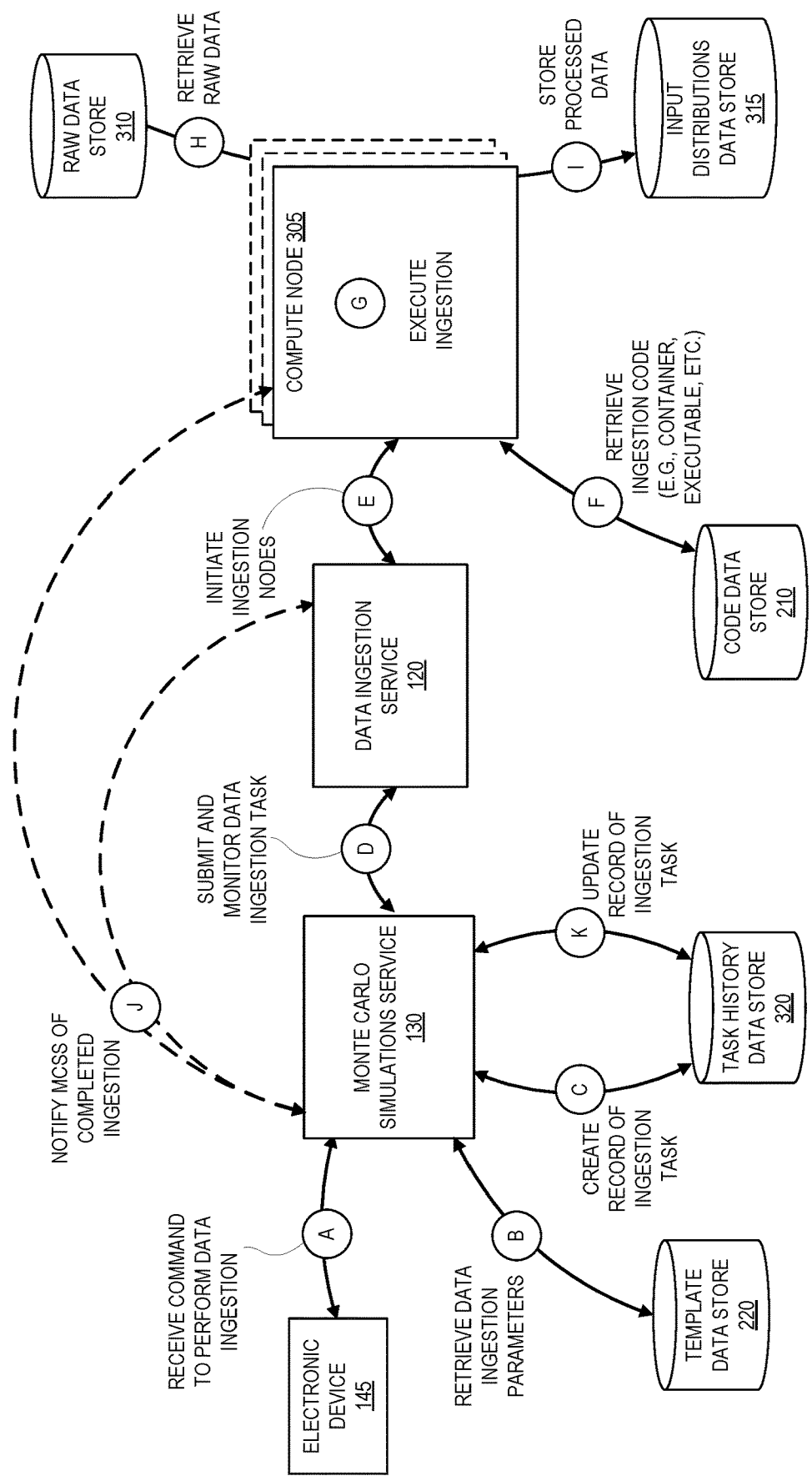
FIG. 3 is a block diagram of the operating environment of FIG. 1 illustrating the operations performed by the components of the operating environment to prepare input distributions in a reproducible Monte Carlo simulation pipeline, according to some embodiments.

FIG. 3 is a block diagram of the operating environment of FIG. 1 illustrating the operations performed by the components of the operating environment to prepare input distributions in a reproducible Monte Carlo simulation pipeline, according to some embodiments. At a high level, the operations illustrated in FIG. 3 isolate the data required for a Monte Carlo simulation from other extraneous data in the raw data stored in a raw data store 310. This reduces the size of the data to improve the runtime performance of simulations performed with the MCSS 130. The operations illustrated in FIG. 3 further serve to preserve input distributions based on raw data sources that are occasionally overwritten (e.g., a logging mechanism that periodically logs data in a circular buffer on a fixed-size storage medium thereby overwriting the oldest logs).

At circle A, the MCSS 130 receives a command to perform data ingestion (e.g., via an API call). The command may originate from the electronic device 145 or from another process (e.g., a scheduler, a process monitoring the raw data store 310 and issue a command in response to new raw data becoming available, etc.). In response to the received command to perform data ingestion, the MCSS 130 retrieves data ingestion parameters from the template data store 220, as indicated at circle B. Such parameters may include the location of the source code and/or executables that define the data ingestion algorithm, the location of the raw input data, the location to store input data distributions based on the raw input data, etc.

At circle C, the MCSS 130 creates a new record for the ingestion task in a task history data store 320. The MCSS 130 tracks each task associated with a template in the task history data store 320. Records in the task entry data store 320 may include data such as a template identifier to identify the template associated with the task record, a start date and time for the task, an end date and time for the task, the specific output file(s) associated with the task (e.g., in the input distributions data store 315), a timestamp associated with the raw data stored in the raw data store 310, etc.

At circle D, the MCSS 130 submits a data ingestion task, including one or more data ingestion parameters, to the data ingestion service 120. Also at circle D, the MCSS 130 may check the status of the ingestion process by querying the data ingestion service 120 so as to update to the electronic device 145 with a data ingestion status, such as an estimated time when the data ingestion task will complete. The MCSS 130 may relay the data ingestion status to the electronic device 145 or other originator of the command to perform data ingestion.

In response to receiving the data ingestion task, the data ingestion service 120 initiates one or more compute nodes 305 to perform data ingestion, as indicated at circle E. In some embodiments, the data ingestion service 120 initiates the compute node(s) 305 via the hardware virtualization service 110. In some embodiments, the number and type of initiated nodes 305 depends on the data ingestion parameters (e.g., pipeline control parameters specifying the number and type of processing cores, memory, etc. to use for data ingestion), if any. In some embodiments, the number and type of initiated compute nodes 305 depends on an analysis of the data ingestion code and/or data ingestion task by the data ingestion service 120. For example, if the data ingestion task identifies five separate raw data sets, the data ingestion service 120 may initiate five compute nodes 410 to process the five raw data sets in parallel. As another example, the data ingestion service 120 may analyze the ingestion code to determine how to parallelize or serialize data processing operations with multiple compute nodes 305. If the data ingestion service 120 determines that the ingestion code has three sequential stages, X→Y→Z (where the output of one stage is fed to another stage), the data ingestion service 120 can instantiate three compute nodes, one performing stage X based on raw data, the next receiving the output of stage X and performing stage Y, and the third receiving the output of stage Y and performing stage Z to generate the input distributions. Similarly, the data ingestion service 120 may break the raw data into portions that may be independently processed. For example, the data ingestion service 120 may break the raw data into tenths and instantiate ten compute nodes 305 to each ingest one tenth of the overall raw data. Note that if the optimal number or configuration of compute nodes to initiate based on the analysis of the data ingestion code and/or the data ingestion task is greater than a number or configuration specified via input parameters in the template, the data ingestion service 120 may send a notification to the MCSS 130 of the difference(s) and proceed with data ingestion under the constraints imposed by the input parameters specified in the template. Note that in some embodiments, the aforementioned analysis of the data ingestion code and/or data ingestion task is performed by the MCSS 130 rather than the data ingestion service 120.

Depending on any pipeline control parameters specified in the template, the data ingestion service 120 (e.g., via hardware virtualization service 110) may initiate the compute node(s) 305 in a number of ways. For example, the template may specify a machine image that includes the code for performing data ingestion, a machine image that does not include the data ingestion code and a location of the data ingestion code, a container containing the code for data ingestion, etc. If a machine image that includes the code for performing data ingestion is specified, the compute node(s) 305 boot based on the specified machine image. If a machine image and location of the code are specified, the compute node(s) 305 may boot using the machine image (or a default machine image) and load the code from the code data store 210 as indicated at circle F. If a container is specified, an existing VM may load and launch the container from the code data store 210 as indicated at circle F. In embodiments where the code is loaded from the code data store 210, the data ingestion service 120 may direct the compute node(s) 305 to a particular version of the data ingestion code if specified in the template.

The locations of the raw data store 310 and input distributions data store 315 are parameters stored with the template in the template data store 220 and passed to the compute nodes 305 via the MCSS 130 and the data ingestion service 120. Depending on the parallelization and/or serialization of the data ingestion code, the data ingestion service 120 may further pass one or more parameters to each of the initiated compute nodes 305 to identify its data source (e.g., an upstream compute node 305 performing partial data ingestion, the raw data store 310, a portion of the raw data in raw data store 310) and data sink (e.g., a downstream compute node 305 performing subsequent data ingestion operations, the input distributions data store 315, etc.), if different than the locations specified in the template.

The initiated and configured compute nodes 305 execute the ingestion code to ingest the raw data and generate input distributions, as indicated at circles G, H, and I. In some embodiments, the ingestion code comprises two phases. In a first phase, the compute nodes 305 process the raw data. In a second phase, a compute node 305 performs post-processing operations, such as consolidating output data generated during the first phase, calculating characteristics of the output data, etc. These characteristics may include summary statistics (e.g., averages, etc.), counts of data points within distributions, checksums associated with the distributions, etc. In some embodiments, either the compute node(s) 305 or the data ingestion service 120 sends a message to the MCSS 130 when the ingestion process completes, as indicated at circle J.

At circle K, the MCSS 130 updates the task record in the task history data store 320 with information such as the date and time the task was completed. In addition, in some embodiments, the MCSS 130 stores the characteristics of the input distribution(s) in the task record. Such characteristics might include a mean of the values in the input distribution(s), a total number of input values in the distribution(s), or the like. The characteristics may be generated by the ingestion code, as described above, or determined by the MCSS 130 after the ingestion completes. These characteristics may be used to compare input distributions generated from different raw data sets, such as when the raw data in the raw data store 310 is updated on a schedule (e.g., daily, weekly, monthly, etc.). For example, after performing the ingestion task associated with updated raw data and determining characteristics of the new input distributions, the MCSS 130 accesses the task history data store 320 to identify a prior ingestion task associated with the same template along with any characteristics of the prior input distribution, in some embodiments. If the characteristic(s) do not match or fall outside of a tolerance, the MCSS 130 may issue a warning or an error message to indicate that there is a discrepancy between prior input distributions and the current input distribution.

In some embodiments, the raw data within the raw data store 310 is in a format that can be used by the simulation code. In such cases, the user can set the template input parameter specifying the location of the input data distributions to the location of the raw data, or the data ingestion code simply copies the data in the raw data store 310 to the input distributions data store 315 (e.g., to preserve the data).

Figure 4:
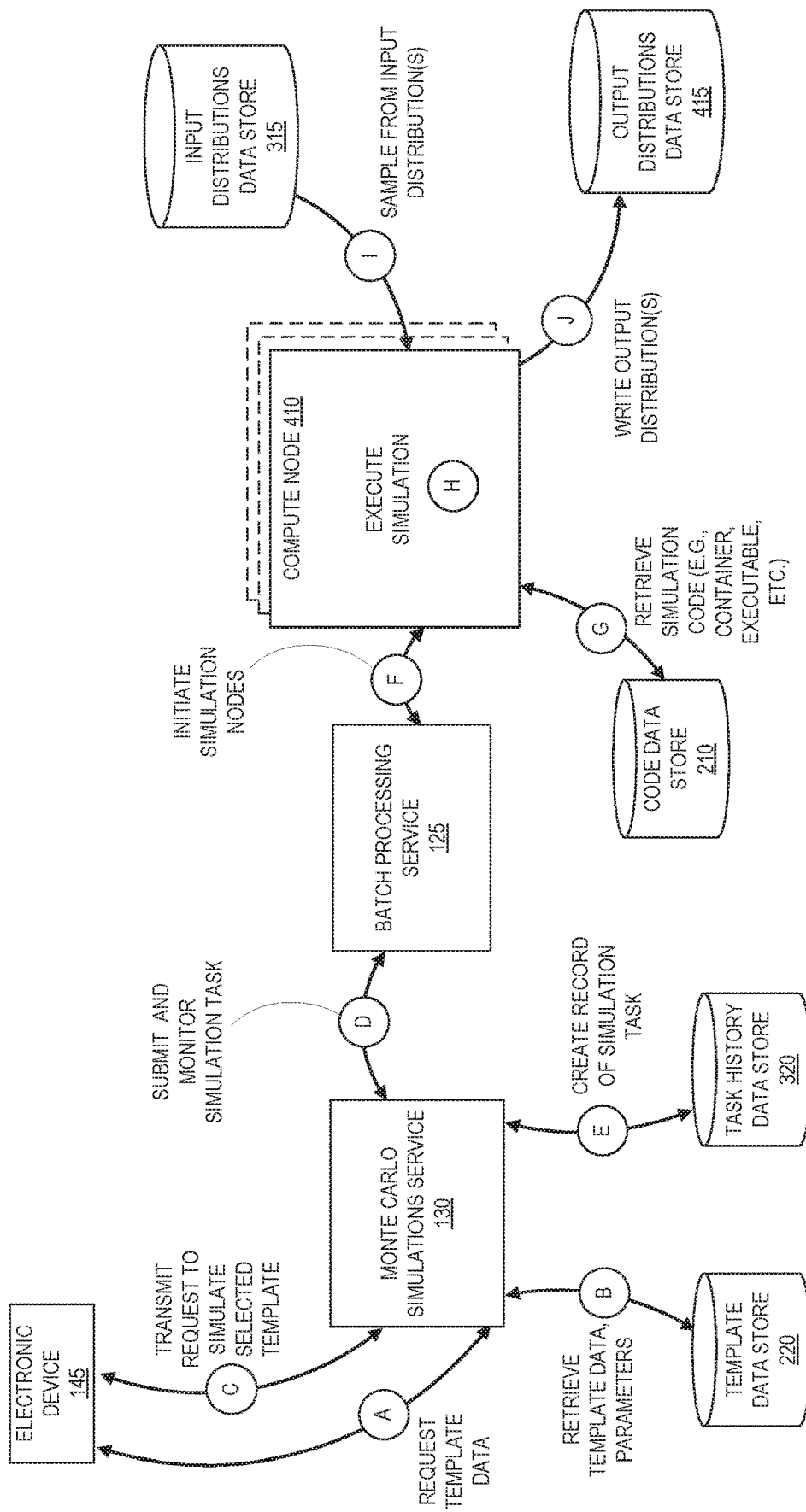
FIG. 4 is a block diagram of the operating environment of FIG. 1 illustrating the operations performed by the components of the operating environment to perform one or more Monte Carlo simulations in a reproducible Monte Carlo simulation pipeline, according to some embodiments.

FIG. 4 is a block diagram of the operating environment of FIG. 1 illustrating the operations performed by the components of the operating environment to perform one or more Monte Carlo simulations in a reproducible Monte Carlo simulation pipeline, according to some embodiments. At a high level, the operations illustrated in FIG. 4 perform a Monte Carlo simulation. In some embodiments, each group of one or more simulations is referred to as a "batch," each simulation within a batch is referred to as a "run," and each run includes some number of sample-process-output iterations where the simulation randomly samples an input from an available input distribution and processes the sampled input to generate an output. As indicated above, in some embodiments the simulation randomly generates samples from a parametric input distribution. Further, in some embodiments the input data distributions are first parametrically modeled prior to simulation and samples from the parametric models of the input distribution(s). The output from each iteration is stored and together form an output distribution. Amongst other things, template input parameters can define the number of runs in a batch, the number of iterations in a run, the seed used to randomly select inputs, the processing of the selected inputs, etc.

As indicated at circle A, an electronic device 145 is in communication with the MCSS 130. A front end (not shown) may handle communications between the electronic device 145 and the MCSS 130, such as the front end 135 described above. Subject to any identity and permission checks, the MCSS 130 identifies available templates from the template data store 220, as indicated at circle B, and sends information identifying the available templates to the electronic device 145 to allow a user of the electronic device 145 to select from the available templates. In some embodiments, the available templates include templates that are part of a template marketplace including templates from third-parties. In response to receiving a selection of one of the available templates from the electronic device 145, the MCSS 130 may send detailed information about the selected template to the electronic device 145, including the identity of any configurable input parameters identified by the template (e.g., runtime control parameters) to allow a user to configure one or more simulations based on the template. Once the configurable parameters have been set, the electronic device 145 transmits a request (e.g., via an API call) to perform one or more simulations of the selected and configured template to the MCSS 130, as indicated at circle C.

In response to receiving the request to perform a simulation, the MCSS 130 retrieves simulation parameters from the template data store 220 (if omitted from the request) and submits a simulation task, including any simulation input parameters specified in the selected template and any configurable simulation input parameters specified in the request from the electronic device 145, to the batch processing service 125, as indicated at circle D. Also at circle D, the MCSS 130 may check the status of the simulation(s) by querying the batch processing service 125. The MCSS 130 may send the status to the electronic device 145 to provide an indication of when the simulation task will complete. Note that in some embodiments, the MCSS 130 performs various integrity checks based on available data as part of submitting the simulation task to ensure reproducibility. For example, the MCSS 130 reads code checksums stored with the template in the template data store 220 with checksums stored in the code data store 210 to ensure the task is being performed with the expected version of code. As another example, the MCSS 130 may compare the checksums of the input distributions calculated during data ingestion and stored in the task history data store 320 against checksums embedded or stored with the actual input distributions in the input distributions data store 315. If any of the checksums do not match, the MCSS 130 may issue a warning or an error message prior to issuing the simulation task or decline to issue the simulation task pending an override from the electronic device 145.

At circle E, the MCSS 130 creates a new record for the simulation task in the task history data store 320. The MCSS 130 tracks each task associated with a template in the task history data store 320. Records in the task entry data store 320 may include data such as a template identifier to identify the template associated with the task record, a start date and time for the task, an end date and time for the task, the specific output file(s) associated with the task (e.g., in output distributions data store 415), timestamp(s) and/or checksum(s) associated with the input distribution(s) in the input distributions data store 315, any specified input parameters associated with the task (e.g., configured runtime control parameters), the identity of the electronic device 145 submitting the request, etc.

In response to receiving the simulation task, the batch processing service 125 initiates one or more compute nodes 410 to perform simulations, as indicated at circle F. In some embodiments, the batch processing service 125 initiates the compute node(s) 410 via the hardware virtualization service 110. In some embodiments, the number and type of initiated compute nodes 410 depends on the simulation parameters (e.g., pipeline control parameters specifying the number and type of processing cores, memory, etc. to use for simulation), if any. In some embodiments, the number and type of initiated compute nodes 410 depends on an analysis of the simulation code and/or simulation task by the batch processing service 125. For example, if the simulation task includes a batch of five simulations, the batch processing service 125 may initiate five compute nodes 410 to perform the five simulations in parallel. Further, as was the case with the data ingestion service 120, the batch processing service 125 may analyze the simulation code to determine how to parallelize or serialize simulation operations across multiple compute nodes 410, according to some embodiments. For example, a single simulation run may be divided into two sequential stages and each stage may be divided into multiple parallel parts. The outputs of a first stage performed in parts by a plurality of compute nodes are inputs to a second stage performed in parts by another plurality of compute nodes. In some embodiments, the same compute nodes are used in both the first stage and the second stage, with intermediate results being stored in a memory while the compute nodes are reconfigured to perform the second stage. Note that if the optimal number or configuration of compute nodes to initiate based on the analysis of the simulation code and/or simulation task exceeds a number or configuration specified via input parameters in the template, the batch processing service 125 may send a notification to the MCSS 130 of the difference(s) and proceed with simulation under the constraints imposed by the input parameters specified in the template. Note that in some embodiments, the aforementioned analysis of the simulation code and/or simulation task is performed by the MCSS 130 rather than the batch processing service 125.

Depending on any pipeline control parameters specified in the template, the batch processing service 125 (or hardware virtualization service 110) may initiate the compute node(s)

410 in a number of ways. For example, the template may specify a machine image that includes the code for performing a simulation, a machine image that does not include the simulation code and a location of the simulation code, a container containing the code for simulation, etc. If a machine image that includes the code for performing simulation is specified, the compute node(s) 410 boot based on the specified machine image. If a machine image and location of the code are specified, the compute node(s) 410 may boot using the machine image (or a default machine image) and load the code from the code data store 210 as indicated at circle G. If a container is specified, an existing VM may load and launch the container from the code data store 210 as indicated at circle G. In embodiments where the code is loaded from the code data store 210, the batch processing service 125 may direct the compute node(s) 410 to a particular version of the data ingestion code if specified in the template.

The MCSS 130 and batch processing service 125 pass the various input parameters that configure each simulation to the compute node 410. The initiated and configured compute node 410 executes the simulation code using the input parameters to perform Monte Carlo simulation(s), as indicated at circle H. At a high level, the simulation(s) sample data from input distributions (e.g., stored in input distributions data store 315 or defined by parametric input distribution parameters), as indicated at circle I, process the sampled data, and store generated data to form an output distribution (e.g., in output distributions data store 415), as indicated at circle J. The simulations being performed by compute node(s) 410 generally include many rounds, or iterations, of sampling and processing. During sampling, the simulation code randomly samples one or more values from the input distribution(s). In some embodiments, the random sampling occurs via a pseudorandom number generator initiated with a seed value specified in the template. In some embodiments, sampling occurs without replacement. In some embodiments, the simulation code comprises two phases. In a first phase, the compute nodes 410 perform the simulation(s). In a second phase, a compute node 410 performs post-simulation operations, such as consolidating output data distributions generated during the first phase, etc.

In scenarios where a simulation run is distributed across multiple compute nodes referencing the same input distribution(s), the MCSS 130 or batch processing service 125 causes each compute node 410 to use a different seed value to prevent each compute node 410 from selecting the same set of samples. For example, the seed value stored with the template may be incremented by 1 for each compute node, so the first compute node 410 uses the seed value stored with the template, the second compute node uses the seed value+1, the third compute node uses the seed value+2, etc.

During processing, the code processes the sampled input value to generate an output value. In some embodiments, the processing is configured via, inter alia, simulation runtime parameters that were specified in the simulation request transmitted from the electronic device 145 to the MCSS 130 at circle C. The sampling and processing phases are repeated for some number of iterations, which may be an input parameter specified in the simulation template. The output values generated over the number of iterations form an output distribution.

Figure 5:
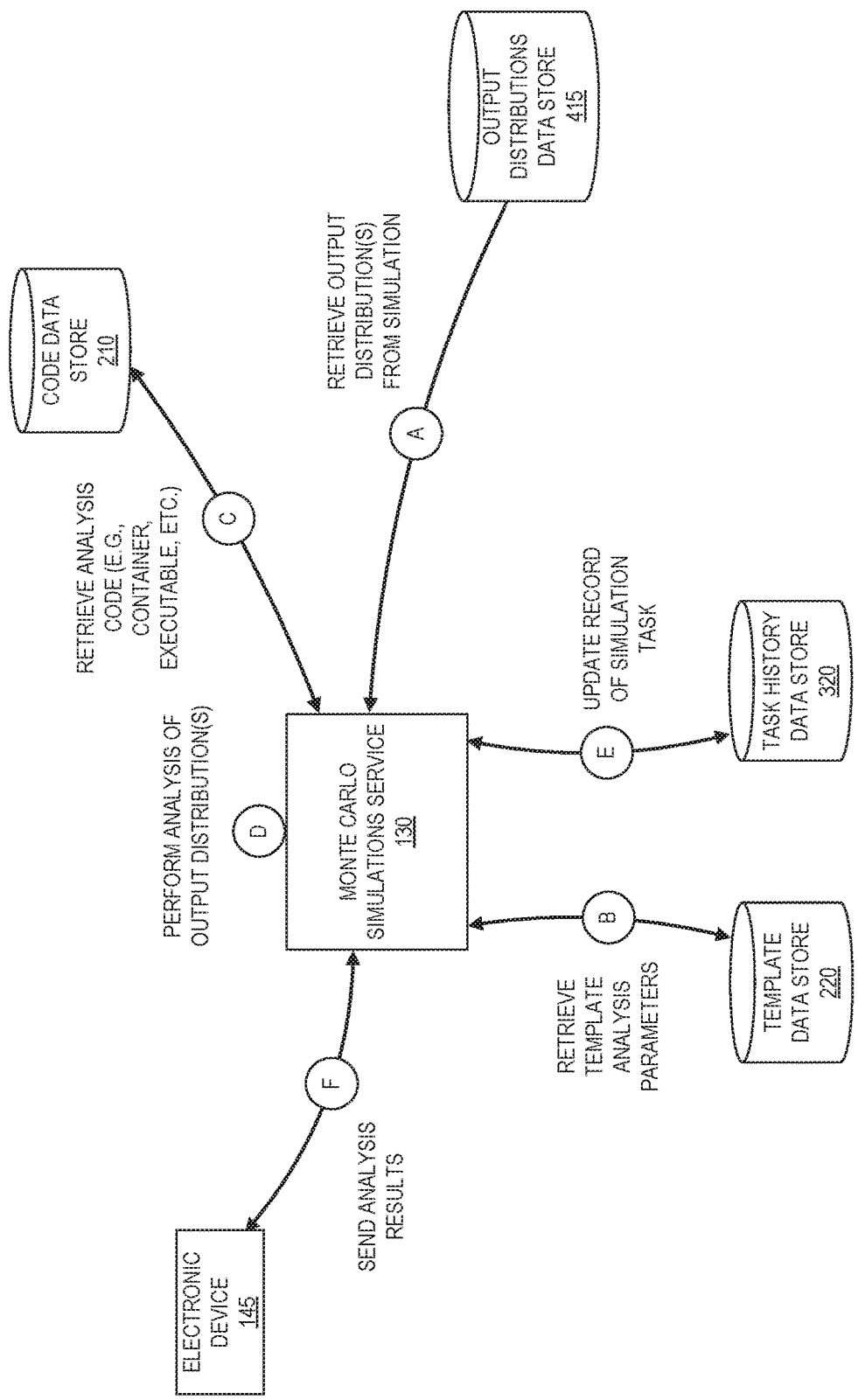
FIG. 5 is a block diagram of the operating environment of FIG. 1 illustrating the operations performed by the components of the operating environment to analyze and summarize simulation results in a reproducible Monte Carlo simulation pipeline, according to some embodiments.

FIG. 5 is a block diagram of the operating environment of FIG. 1 illustrating the operations performed by the components of the operating environment to analyze and summarize simulation results in a reproducible Monte Carlo simulation pipeline, according to some embodiments. In some embodiments, the number of output values generated from the simulation is similar to the number of input values in the input distribution. Because the input distributions can have significant numbers of input values (e.g., millions, billions, or more), the generated output distributions are of comparable size. To eliminate the need to transfer large amounts of data within the provider network 100, particularly when a user wants to browse and/or compare simulation results, the analysis phase of the pipeline performs an analysis on the output distribution(s) and generates a reduced data set that summarizes the simulation results.

At circle A, the MCSS 130 retrieves output distribution data for analysis. The MCSS 130 may retrieve the output data distribution in response to a request to perform the analysis (e.g., sent by the electronic device A45, not shown) or in response to another trigger event from the batch processing service 125 (e.g., a return message indicating the batch processing simulation task completed) or another process (e.g., a process monitoring the output distributions data store 415 to detect newly-generated output distributions).

At circle B, the MCSS 130 B retrieves template information, such as the location (and version, if specified) of the analysis code and any analysis input parameters. The MCSS 130 retrieves the specified analysis code from the code data store 210 as indicated at circle C. The MCSS 130 executes the analysis code to analyze the output distribution(s), as indicated at circle D. Such analysis may comprise calculating one or more statistics or parameters that characterize the output distribution, such as a mean and standard deviation. Additionally, the analysis may compare the output distributions or statistics of the output distributions to determine whether the run passed or failed given certain runtime control parameters. For example, a runtime control parameter might be a Service Level Agreement (SLA) parameter that indicates that 99% of the values in the output distribution fall below a certain level. The analysis code may calculate the value of the 99th percentile of the output distribution and return that value along with an indication of whether the value passed or failed the SLA parameter.

At circle E, the MCSS 130 records the results of the analysis to the record of the simulation task in the task history data store 320. The MCSS 130 can send analysis results to the electronic device 145, as indicated at circle F, in response to a request (e.g., an API call) to retrieve results from one or more simulations. In this manner, customers can apply custom visualization toolkits to the simulation results. By analyzing output distributions after they are generated and storing the analysis results with the templates, the MCSS 130 can respond to requests to browse simulation results, compare simulation results, etc. from the electronic device 145 without having to refer to large amounts of data in the form of the output distributions.

Note that the operations illustrated in FIG. 5 to analyze and summarize simulation results are depicted and described as being performed by the MCSS 130. In some embodiments, such as when the simulation output distributions are large, the MCSS 130 can delegate the analysis stage to the batch processing service 125 as it did before with the simulation task to have one or more compute nodes perform the analysis (not shown). For example, the MCSS 130 submits an analysis task to the batch processing service 125, with any input parameters associated with the analysis, the location of the analysis code, and the location of any output data distributions. The batch processing service 125 may initiate one or more compute nodes to perform the analysis of the output data distribution(s) and store the results.

In some embodiments, the MCSS 130 enables a user to explore the simulation model space via an optimization request. For example, the simulation request from the electronic device 145 (circle C in FIG. 4) may be an optimization request that includes at least one input parameter that specifies an optimization criterion for the analysis stage (e.g., a pass/fail threshold) and at least one identification of an input parameter as a variable to be optimized. The request may further specify a range for the variable input parameter. In response to receiving such a request, the MCSS 130 retrieves simulation parameters from the template data store 220 (if omitted from the request) and submits one or more simulation tasks. The MCSS 130 may implement one or more optimization techniques that are selected as part of the optimization request or the template may specify particular technique (e.g., via an input parameter that identifies optimization code), such as a random search, grid search, a Bayesian optimizer, various iterative solutions including gradient free methods, etc. For example, the MCSS 130 may submit two simulation tasks with two different values for the variable input parameter (within the range, if specified). After the simulations run and an analysis of each simulation is completed, the MCSS 130 can examine the analysis results (e.g., from circle D of FIG. 5) against the optimization criterion to determine a relationship between the variable input parameters and the criterion. If the criterion is not met, the MCSS 130 may submit additional simulation tasks with configurable values adjusted based on the prior results and perform additional analyses on the results, repeating process of simulating, analyzing, and manipulating the simulation parameters until the optimization process identifies a solution (the criterion is met). In this manner, the MCSS 130 allows the user to explore the simulation model space without individually configuring simulations by manually adjusting the input parameters for a number of simulations.

Figure 6:
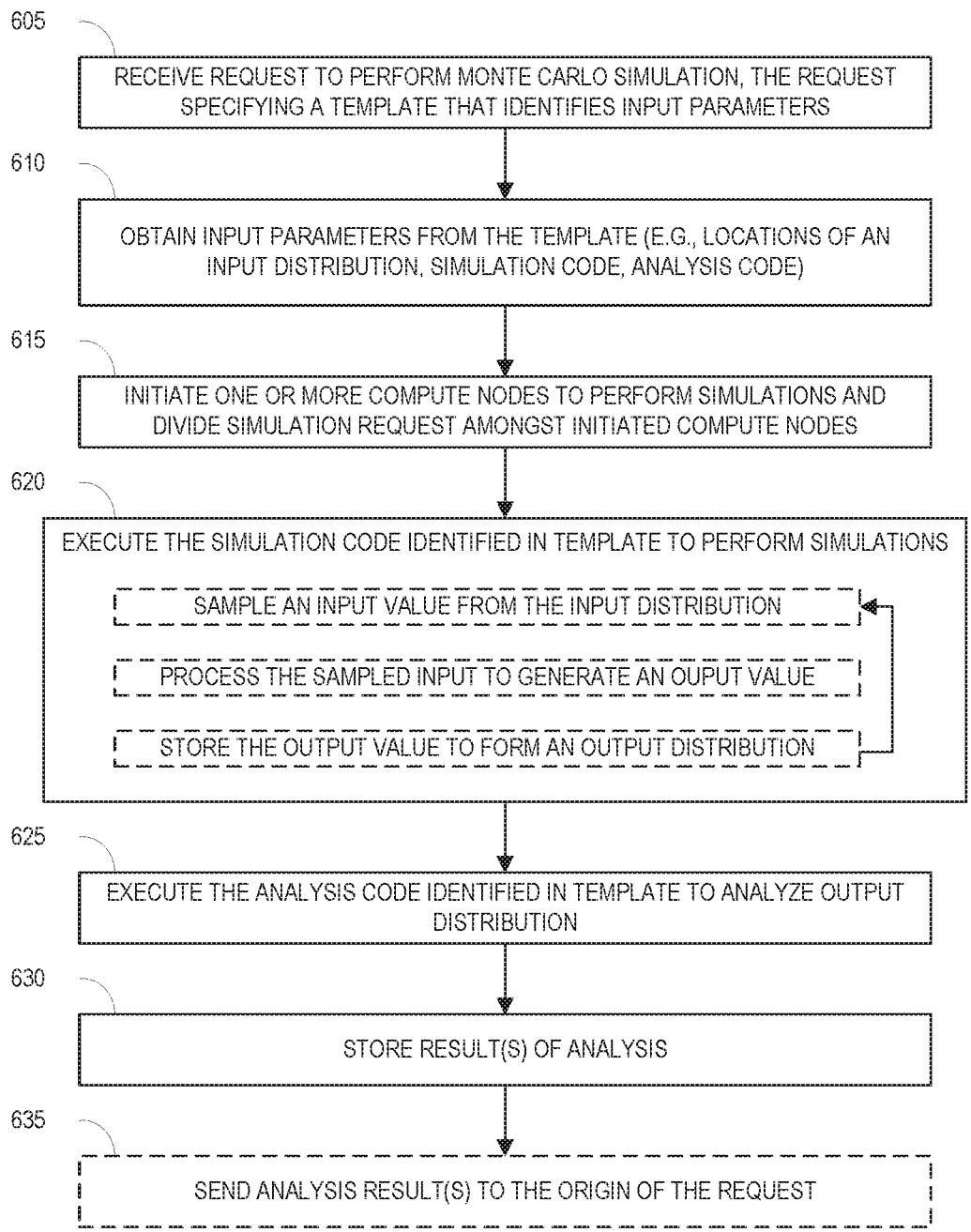
FIG. 6 is a flow diagram depicting a Monte Carlo simulation routine in a reproducible Monte Carlo simulation pipeline, according to some embodiments.

FIG. 6 is a flow diagram depicting a Monte Carlo simulation routine in a reproducible Monte Carlo simulation pipeline, according to some embodiments. Some or all of the operations illustrated in FIG. 6 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations illustrated in FIG. 6 are performed by the MCSS 130 of the other figures.

At block 605, the processor receives a request to perform a Monte Carlo simulation. The request specifies a template that identifies input parameters to the simulation. The request may further specify one or more runtime control parameters identified in the template. Additional operations associated with block 605 can be found in the discussion associated with circles A through C in FIG. 4.

At block 610, the processor obtains input parameters from the template. These input parameters can include, but are not limited to, a location of input data distributions for the simulation, a location to store output data distributions from the simulation, a seed value used for a pseudorandom number generator used by the simulations, parametric input distribution parameters, locations of the simulation code and of the analysis code, pipeline control parameters, and/or any runtime control parameters not specified in the request (i.e., default values). Additional operations associated with block 610 can be found in the discussion associated with circles B and D in FIG. 4.

At block 615, the processor initiates one or more compute nodes (e.g., VM instances, bare metal instances, containers executing within a VM, etc.) to perform simulations. The compute nodes may be initiated via the hardware virtualization service 110. The initiation includes configuring the compute nodes with the appropriate environmental settings for the simulation code as may be specified in the template either expressly or via the identification of a particular machine image. In addition, the processor divides the requested simulation (or causes it to be divided) amongst the initiated compute nodes. Additional operations associated with block 615 can be found in the discussion associated with circles D and F in FIG. 4.

At block 620, the initiated compute nodes execute the simulation code to perform the simulation. Additional operations associated with block 620 can be found in the discussion associated with circles H through J in FIG. 4.

At block 625, the processor executes the analysis code to analyze the output distribution(s) generated as part of the simulation. Additional operations associated with block 625 can be found in the discussion associated with circles A through D in FIG. 5.

At block 630, the processor stores the result(s) of the analysis, e.g., in the task history data store 320. Additional operations associated with block 625 can be found in the discussion associated with circle E in FIG. 5.

At block 635, the processor sends the result(s) to the origin of the simulation request, if requested. Additional operations associated with block 625 can be found in the discussion associated with circle F in FIG. 5.

Figure 7:
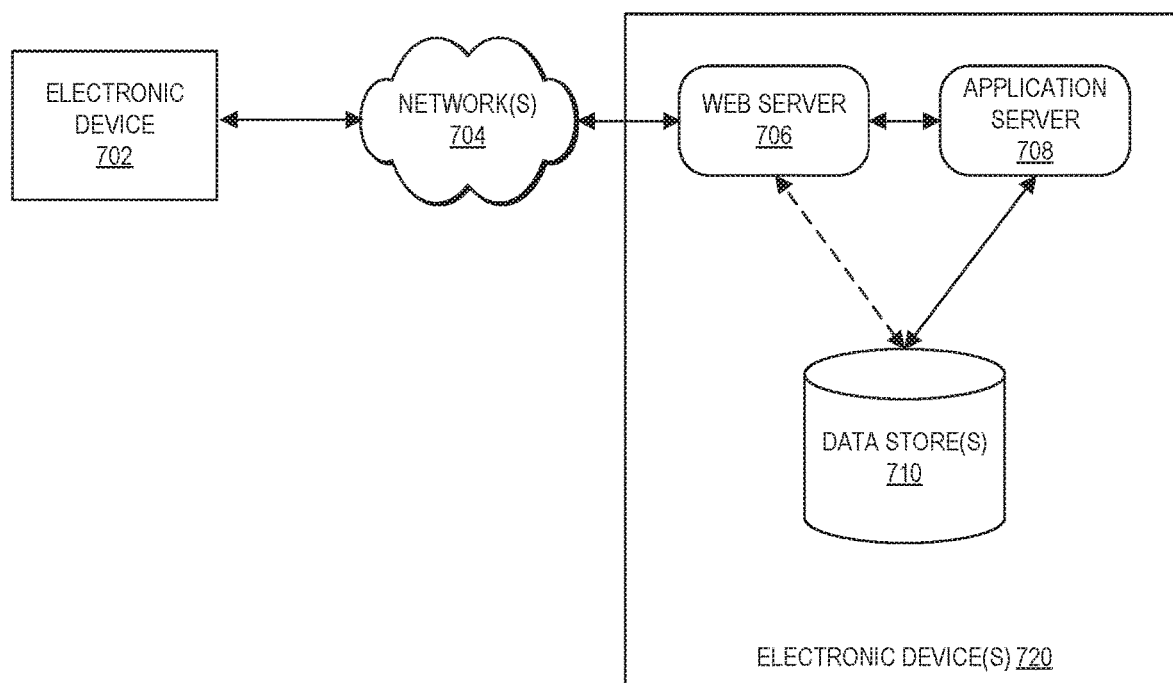
FIG. 7 illustrates an example of an environment for implementing aspects in accordance with various embodiments.

As discussed, different approaches can be implemented in various environments in accordance with the described embodiments. For example, FIG. 7 illustrates an example of an environment for implementing aspects in accordance with various embodiments. For example, in some embodiments communications include HTTP messages that are sent and received between an electronic client device 702 (e.g., the electronic device 145) and a web server 706 (e.g., a front end 135). Users, via electronic devices, may interact with the provider network 100 via a web portal provided via the web server 706 and application server 708 (e.g., the MCSS 130). In some embodiments, the web server 706 interacts with the MCSS 130 via an API. As will be appreciated, although a web-based environment is used for purposes of explanation, different environments may be used, as appropriate, to implement various embodiments.

The electronic client device 702 (e.g., electronic device 145), which may also be referred to as a client device and can be any appropriate device operable to send and receive requests, messages or information over an appropriate network 704 and convey information back to a user of the device 702. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 704 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 704 includes the Internet, as the environment includes a web server 706 for receiving requests and serving content in response thereto, although for other networks an alternative device serving a similar purpose could be used, as would be apparent to one of ordinary skill in the art.

The illustrative environment includes at least one application server 708 (e.g., the MCSS 130) and a data store 710 (e.g., the template data store 210, the task history data store 320). In some embodiments, the template data store 220 and the task history data store 320 are tightly coupled with the electronic device(s) implementing the application server 708, either in terms of software communications or hardware resources. For example, the template data store 220 may be distributed across one or more computer readable media (e.g., storage drives) that are coupled via a communication bus to the one or more electronic devices that implement the application server 708. As another example, the messaging between the application server 7008 and the task history data store 320 may be optimized to reduce computational overhead associated with reading simulation or ingestion task results to provide to the web server 706.

The handling of requests and responses, as well as the delivery of content between the client device 702 and the application server 708, can be handled by the web server 706. The web server 706 may directly access data in the data store 710 or indirectly via the application server 708. It should be understood that there can be several application servers, layers, or other elements, processes or components, which may be chained or otherwise configured, which can interact to perform tasks such as obtaining data from an appropriate data store. The application server 708 provides content such as text, graphics, audio, video, etc., to be transferred to the client device 702, including content related to the Monte Carlo simulation pipeline (e.g., template identifications, template parameters, simulation results, etc.). Such content may be served to the user by the web server in the form of HyperText Markup Language (HTML), Extensible Markup Language (XML), JavaScript Object Notation (JSON), or another appropriate unstructured or structured language in this example. It should be understood that the web server 706 and application server 708 are not required and are merely example components, as structured code discussed herein can be executed on any appropriate device or host machine as discussed elsewhere herein.

Each of the one or more electronic devices 720 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the environment in FIG. 7 should be taken as being illustrative in nature and not limiting to the scope of the disclosure.

Figure 8:
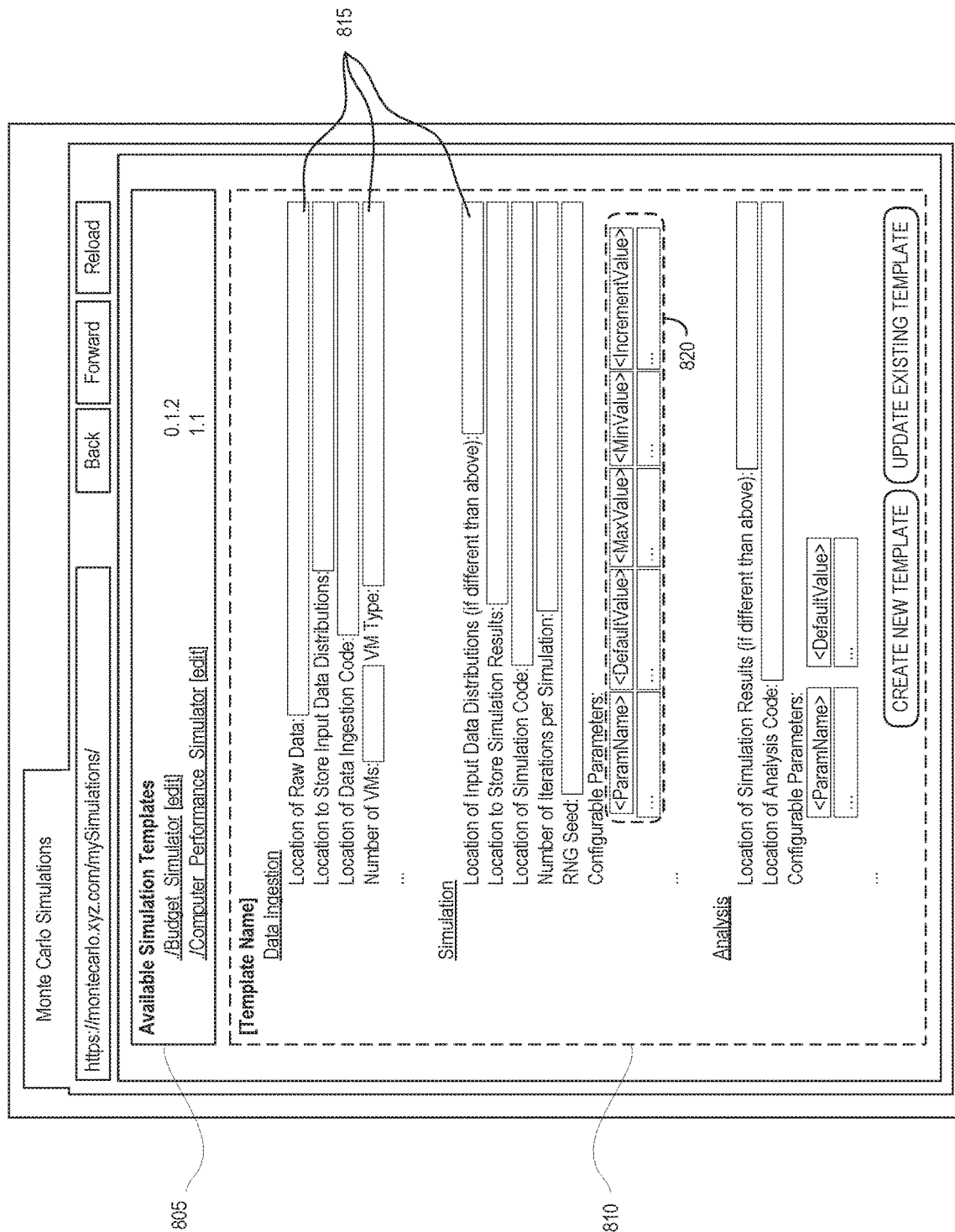
FIG. 8 illustrates certain aspects of a user interface for managing Monte Carlo simulation templates, according to some embodiments.
Figure 9:
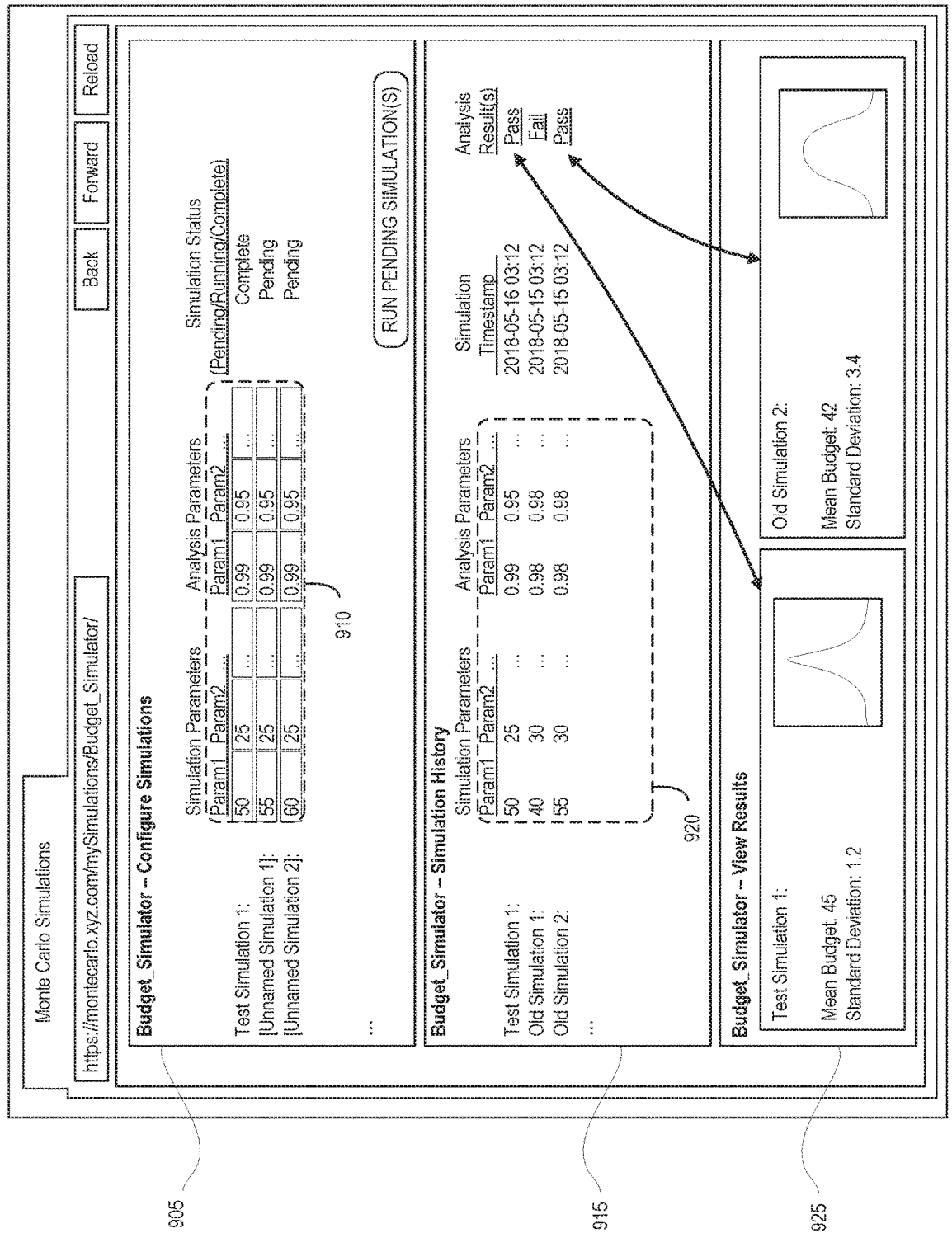
FIG. 9 illustrates certain aspects of a user interface for performing Monte Carlo simulations based on a template, according to some embodiments.

FIG. 8 illustrates certain aspects of a user interface for managing Monte Carlo simulation templates, according to some embodiments. FIG. 9 illustrates certain aspects of a user interface for performing Monte Carlo simulations based on a template, according to some embodiments. The illustrated aspects of the user interfaces in FIGS. 8 and 9 may be rendered by an application executing on the electronic client device 702 based on data received from the MCSS 130 via a front end. For example, a web browser application executing on the electronic client device 702 may render the data received from the MCSS 130 as part of web page data provided by the web server 706. The following description of FIGS. 8 and 9 contemplate a web page interface, although other interfaces are contemplated.

As shown in FIG. 8, the user interface includes a list of available templates 805 and a template editing area 810, each of which may combined or separated into one or more web pages. In some embodiments, the list of available templates 805 is tailored to the permissions associated with an authenticated identity of a user established over a secure communications session between the electronic client device 702 and the web server 706 via the network(s) 705. In some cases, the user interface may include the ability to create a template or to edit an existing template via the template editing area 810. For example, when a user selects an "edit" option associated with a template in the list of available templates 805, the web browser issues a request to the web server 706 for information related to the selected template to display in editing area 810. The editing area 810 includes one or more input parameter fields 815 that will be saved as part of the template. These input parameters include those parameters discussed above, such as the locations of various data stores and configurable parameters, if any, such as runtime control parameters. The user may specify both a name and a default value for any input parameters that can be customized on a per-simulation bases in fields 820. After editing the template input parameters and/or the template name, the user may select a "create new template" or "updating existing template" option to cause the web browser to issue a request to the web server 706 that contains the edited template parameters and an indication of whether to update the existing template or to save the template parameters as a new template. Alternatively, the user may simply begin populating a blank template in the editing area 810 and save the result as a new template.

As shown in FIG. 9, the user interface includes a simulation configuration area 905, a simulation history area 915, and a simulation results area 925, each of which may combined or separated into one or more web pages. The simulation configuration area 905 allows a user to set the various configurable input parameters associated with the template (e.g., the parameter names set in field 820 of FIG. 8 when the template was created or modified). A user can set the configuration parameters for one or more simulations, naming each. Simulations that are being configured but have not been submitted have a "pending" status. Once the user has configured the desired number of simulations, the user may select a "run" option to cause the web browser to issue a request to the MCSS 130 to perform each of the simulations (e.g., as a batch) via web server 706. The simulation configuration area 905 may report the status of simulations that have been submitted but have not yet completed. The simulation history area 925 displays a history of each simulation task that has been performed by the MCSS 130 based on the selected template. The simulation history area 925 further displays the specific configuration parameters that were set as part of the simulation. The simulation history area 925 may include a results indicator, in this embodiment showing a pass/fail indicator for cases where the analysis portion of the pipeline makes a pass/fail determination. In response a user selecting a simulation run in the simulation history (e.g., via a link associated with the results indicator), the web browser may request additional information about the simulation include any summary statistics that were generated as part of the analysis portion of the pipeline. The simulation results area 925 may display detailed results related to each simulation run, including the statistical summaries that were produced as part of the analysis portion of the pipeline.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

Figure 10:
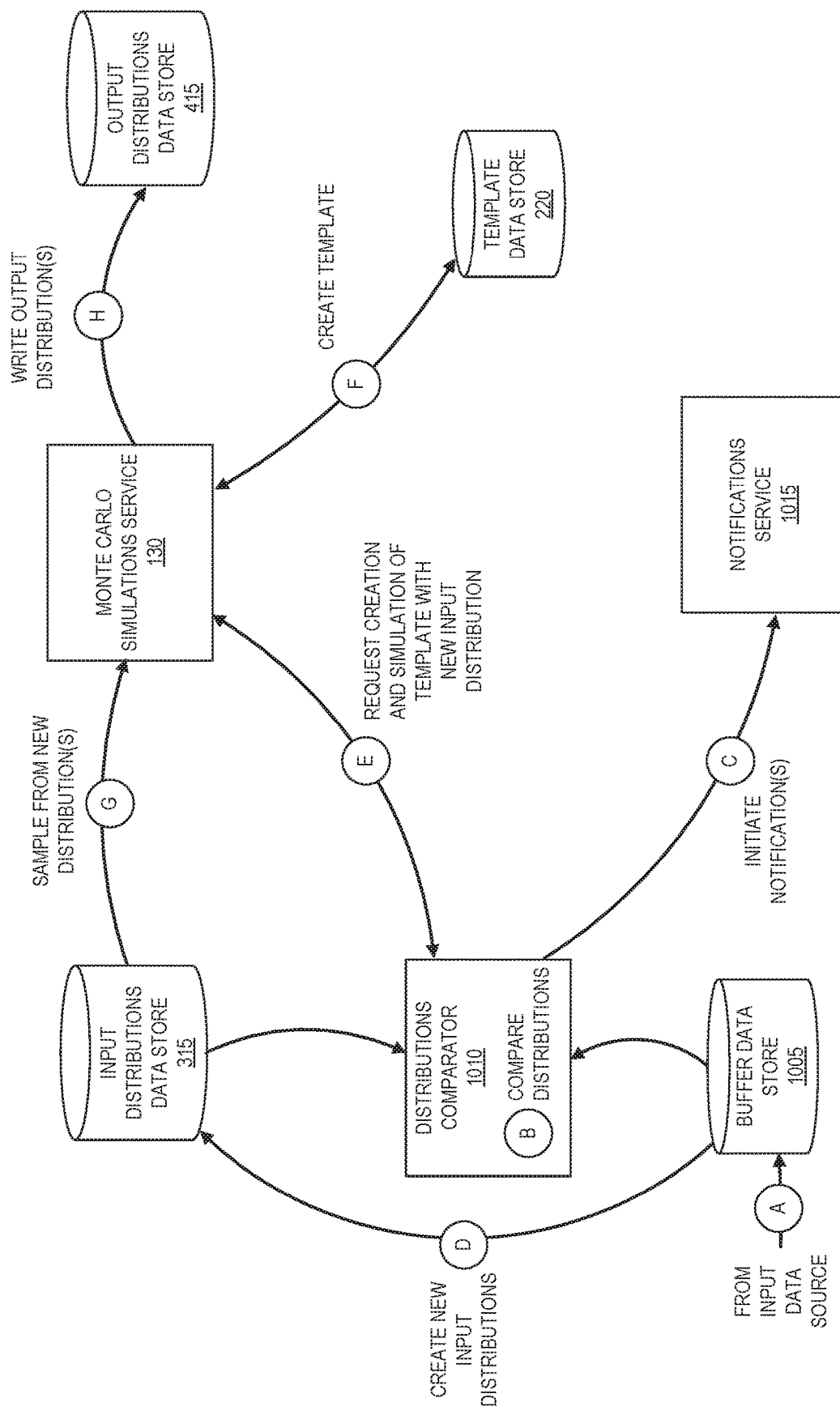
FIG. 10 is a block diagram of the operating environment of FIG. 1 illustrating the operations performed by the components of the operating environment to update Monte Carlo simulations based on deviations in input data distributions, according to some embodiments.

FIG. 10 is a block diagram of the operating environment of FIG. 1 illustrating the operations performed by the components of the operating environment to update Monte Carlo simulations based on deviations in input data distributions, according to some embodiments. Input distributions based on empirical data may shift or change over time as additional data is collected. As a result, the results of Monte Carlo simulations performed based on historical empirical data may become less predictive when the historical empirical data is no longer representative of more current empirical data or real time empirical data, if available. For example, a distribution based on yesterday's price for a given stock in the stock market may not represent the price during the current day (e.g., if the company released unexpected financials overnight). To detect such changes, a distributions comparator 1010 monitors for situations where an input distribution to a Monte Carlo simulation pipeline deviates from a distribution based on more recent data. Distributions comparator 1010 may be implemented, for example, as software executed by computing hardware, as special-purpose hardware, or a combination of both. In configuring the distributions comparator 1010, the user specifies a location of the input distributions being used in the Monte Carlo simulation pipeline (e.g., an input distributions data store 315), a location of the updated empirical data (e.g., a buffer data store 1005), and a comparison technique to be performed between the two distributions. Exemplary comparison techniques include the Kullback-Leibler divergence (KL divergence), the Kolmogorov-Smirnov test (KS test), point estimate comparisons (e.g., comparing differences between means, variances, percentiles, etc. of the distributions), or other similarity or distance metrics (e.g., a value between 0 and 1 where a 0 indicates identity between two distributions). Also as part of the configuration of the distributions comparator 1010 is a deviation threshold to determine when the result of the comparison should cause further action (e.g., when the comparison metric is greater than 0.9, when the comparison metric is less than 0.1, a percentage difference between a point estimate of one distribution relative to a point estimate of the other distribution, etc.). In some embodiments, the configuration may further include one or more template identifiers to identify which templates depend on the input distribution(s) being monitored by the distributions comparator 1010.

As indicated at circle A, the buffer data store 1005 aggregates data from the data source. The source may provide real-time or near real-time data, such as from a hardware sensor (e.g., a temperature sensor used for Monte Carlo based weather simulations) or a software process (e.g., a data feed or stream from a data service for Monte Carlo based financial simulations) located within or without of the provider network 100. The buffer data store 1005 may be the raw data store 310 containing more recent data relative to the last data ingestion or a temporary buffer for data from the data source (e.g., before a periodic process converts the buffered data into a raw data set and stores it in the raw data store 310).

At circle B, the distributions comparator 1010 compares an input distribution feeding a Monte Carlo simulation pipeline with the available data in the buffer data store 1005, such as via use of one of the comparison techniques described above, to generate a comparison metric. The distributions comparator 1010 checks the comparison metric against the deviation threshold to determine whether the data from the data source has deviated from the input distributions feeding the Monte Carlo simulation pipeline. In some embodiments, the distributions comparator 1010 or another process (not shown) may implement one or more preprocessing operations on the data from the input data source. Such preprocessing operations may range from extracting relevant data from all of the data from the data source or performing number or unit conversions to more advanced processing (e.g., regression analysis, dimensionality reduction, etc.). One form of preprocessing involves smoothing the data from the data source to avoid transient events reflected in the data from the input data source from triggering deviation detections. For example, a low-pass filter may smooth the data prior to comparison to avoid deviation detections based on spurious events. In some embodiments, the distributions comparator 1110 performs comparisons only when the number of empirical data points in the data in the buffer data store 1005 has reached a minimum value (e.g., the sample size is sufficiently large).

When a deviation is detected, the distributions comparator 1010 may initiate one or more responsive actions, such as initiating a notification or initiating one or more Monte Carlo simulations based on the more recent input data. For example, at circle C, the distributions comparator 1010 initiates notifications via a notifications service 1015. Such notifications may be sent via one or more communications mediums, such as error notifications routed via an internal notification service to the customer account associated with the provider network 100 or via external mediums such as email, short message service (SMS), a webpage/console, etc. In some embodiments, a threshold for sending a notification may be different than the threshold for triggering deviation detections.

As another example of an action in response to a deviation detection, the distributions comparator 1010 may initiate one or more new Monte Carlo simulations based on the new distribution data in the buffer data store 1005. In some embodiments, the data in the buffer data store 1005 is ingested to form a new input distribution in the input distributions data store 315, as indicated at circle D. For example, the distributions comparator 1010 may make an API call to the MCSS 130 to ingest the data in the buffer data store 1005, as described above with reference to FIG. 3.

At circle E, the distributions comparator 1010 transmits a request to the MCSS 130 to perform a simulation based on the new input distribution (e.g., via an API call as described above with reference to FIG. 4). In some embodiments, the request is to create a new template or a new version of a template specified with the template identifier(s) associated with the distributions comparator 1010 during configuration (e.g., via an API call as described above with reference to FIG. 2). In some embodiments, the MCSS 130 returns a new template identifier associated with the new or updated template. At circle F, the MCSS 130 creates a new template based on the existing template identified with the template identifier that has an updated location for the new input data distribution (e.g., either in the input distributions data store 315 or in the buffer data store 1005). The MCSS 130 then performs the Monte Carlo simulation as indicated by circles G and H-sampling, processing, and outputting an output data distribution to the output distributions data store 415 based in part on the new input distribution.

In some embodiments, the deviation threshold for the distributions comparator 1010 may be specified with a relative rather than an absolute value. For example, if the distribution in the input distribution data store 315 and the distribution in the buffer data store 1005 are Gaussian, a deviation threshold may be a relative variation in the mean and/or variance of the two distributions (e.g., a delta of 1% or more in the mean or variation of the distributions triggers a deviation detection). In this manner, the distributions comparator 1010 may continue to monitor the updated Monte Carlo simulation pipeline, comparing the latest input distribution in the input distributions data store 315 to the newest data in the buffer data store 1005. In some embodiments, the distributions comparator 1010 reconfigures with the location of the updated input data distributions and the new template identifier of the template sampling from the latest input distribution after detecting a deviation.

In some embodiments, the MCSS 130 notifies users accessing a template that was updated due to a deviation detection that a new template is available prior to simulation. For example, after the MCSS 130 receives a request from the distributions comparator 1010 to create a new template based on an existing template identifier that refers to the new input distribution(s), the MCSS 130 responds to subsequent calls from other electronic devices to perform simulations based on the existing template identifier with a message indicating that the input distributions deviated from more recent input data and the identity of the new template.

Although illustrated separately in FIG. 10, the distributions comparator 1010 is part of the MCSS 130 in some embodiments, and the configuration of the distributions comparator 1010 is handled via an API associated with the MCSS 130. In such cases, the MCSS 130 may provide a selection of comparison techniques (e.g., KL divergence, KS test, etc.) or allow the user to specify a location of code for performing the comparison, as was the case for the data ingestion, simulation, and analysis code. In other embodiments, the distributions comparator 1010 is a compute node within the provider network 100 (e.g., configured via the hardware virtualization service 110) or one or more electronic devices that are outside of the provider network 100, such as an electronic device that is part of the customer's network. In these embodiments, the user configures the distributions comparator 1010, which interacts with the MCSS 130 via an API to create or modify simulation templates, initiate simulations, etc.

Figure 11:
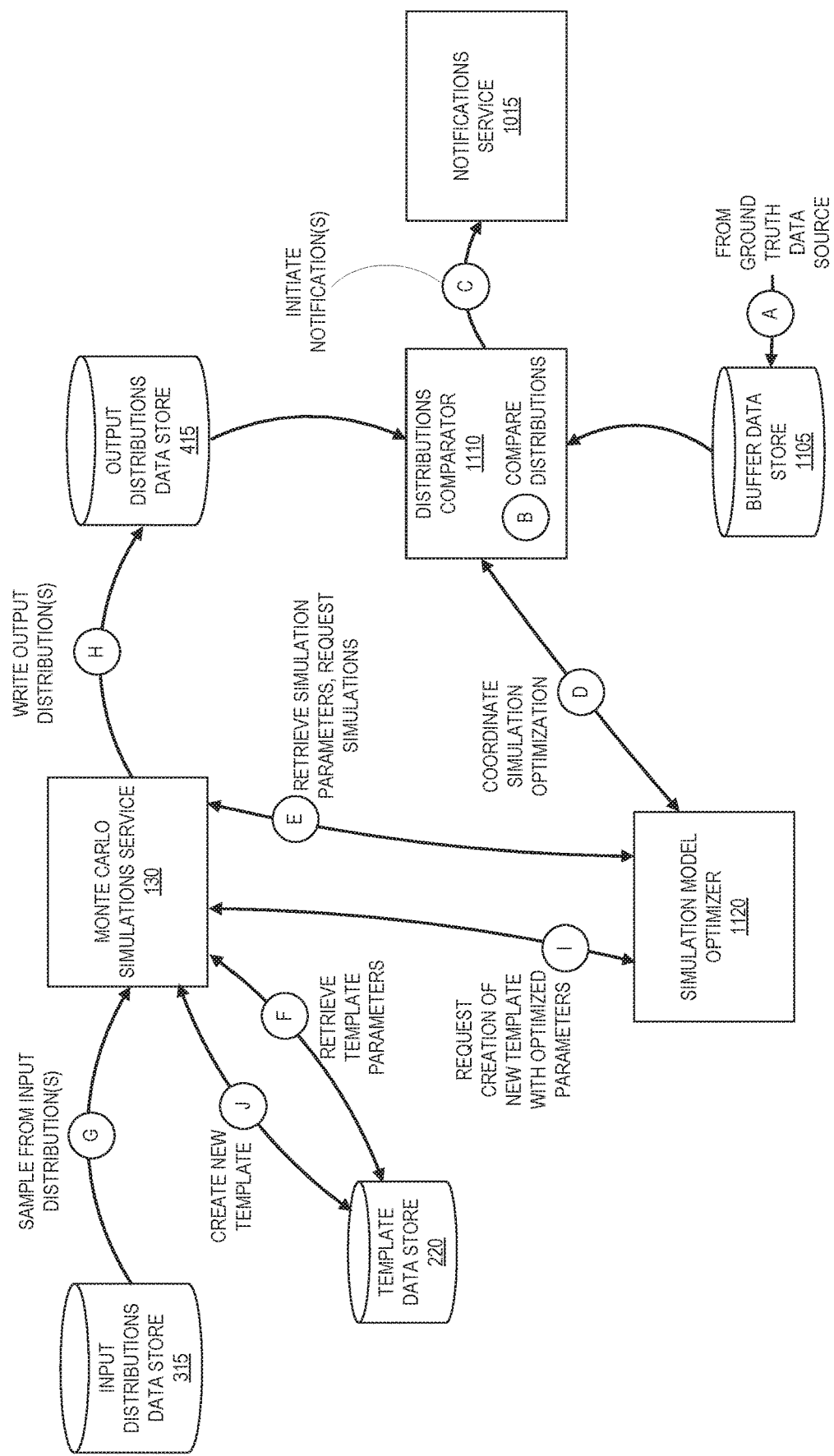
FIG. 11 is a block diagram of the operating environment of FIG. 1 illustrating the operations performed by the components of the operating environment to update Monte Carlo simulations based on deviations in output data distributions, according to some embodiments.

FIG. 11 is a block diagram of the operating environment of FIG. 1 illustrating the operations performed by the components of the operating environment to update Monte Carlo simulations based on deviations in output data distributions, according to some embodiments. Because the output distributions generated by Monte Carlo simulations are subject to the accuracy of the model as specified in the simulation code and the model inputs (e.g., runtime control parameters), the output distributions may not match real world measurements associated with the application being modeled. If available, these ground truth observations can be used to optimize the simulation model so that the simulated output distributions better match the ground truth. To detect such changes, a distributions comparator 1110 monitors for situations where the output distributions generated by a Monte Carlo simulation pipeline deviate from distributions based on ground truth data from a ground truth data source. In configuring the distributions comparator 1110, the user specifies a location of the output distributions from the Monte Carlo simulation pipeline (e.g., an output distributions data store 415), a location of the ground truth data (e.g., a buffer data store 1105), a comparison technique to be performed, and a deviation threshold. As above, exemplary comparison techniques include KL divergence, the Kolmogorov-Smirnov test, point estimate comparisons, or other comparison metrics. In some embodiments, the configuration may further include a template identifier to identify which template generates the output distribution(s) being monitored by the distributions comparator 1110.

As indicated at circle A, the buffer data store 1105 aggregates the data from a ground truth data source. The data source may be a source of real world observations that the simulation attempts to model (e.g., budget overruns on completed projects, default rates for a new loan product, actual weather temperature, stock prices, etc.). At circle B, the distributions comparator 1110 compares the output distribution from a Monte Carlo simulation pipeline with the available data in the buffer data store 1105, such as using one of the comparison techniques described above, to generate a comparison metric. The distributions comparator 1110 checks the comparison metric against the deviation threshold to determine whether the output distribution from the Monte Carlo simulation has deviated from the data from the ground truth data source. Again, the distributions comparator 1110 or another process (not shown) may implement one or more filtering techniques in addition to the comparison technique to avoid spurious or temporary events reflected in the data from the ground truth data source from triggering deviation detections. In some embodiments, the distributions comparator 1110 performs comparisons only when the number of empirical data points in the data in the buffer data store 1105 has reached a minimum value (e.g., the sample size is sufficiently large).

When a deviation is detected, the distributions comparator 1010 may initiate one or more responsive actions, such as initiating a notification or initiating a simulation model optimization to more closely match output distribution to the ground truth data. For example, at circle C, the distributions comparator 1110 initiates notifications via a notifications service 1015. Such notifications may be sent via one or more communications mediums, such as error notifications routed via an internal notification service to the customer account associated with the provider network 100 or via external mediums such as email, short message service, etc. In some embodiments, a threshold for sending a notification may be different than the threshold for triggering deviation detections.

As another example of an action in response to a deviation detection, the distributions comparator 1110 may initiate a simulation optimization by sending a request to a simulation model optimizer 1120, as indicated by circle D. The request includes the template identifier associated with the simulation generating the output distribution that deviated from the ground truth observations along with the metric from the comparison and the deviation threshold or a delta relative to the deviation threshold. In this approach, the comparison technique implemented by the distributions comparator 1110 acts as an objective function for the simulation model optimizer 1120 to optimize.

In response to the optimization request, the simulation model optimizer 1120 may initiate one or more simulations (e.g., as described above with reference to FIG. 4) to optimize the comparison metric such that the simulation output distribution more closely matches the ground truth data. A user may configure the simulation model optimizer 1120 to specify the optimization technique to be performed, the identity of any input parameters to the simulation that can or cannot be changed as part of optimization, constraints on the number of parallel simulations to initiate during optimization, any compute resource limitations, etc. Exemplary optimization techniques include a random search, a grid search, a Bayesian optimizer, other iterative solutions such as gradient free techniques, etc. For example, the simulation model optimizer 1120 may retrieve the input parameters associated with the template identifier from the MCSS 130 as indicated at circle E, which in turn fetches template information from the template data store 220 as indicated at circle F. The simulation model optimizer may randomly vary all or some subset of the runtime control parameters as part of initiating the one or more simulations, each of which sample from an input distribution and generate an output distribution, as indicated by circle G and H.

The number of simulations performed and whether the simulations are performed sequentially or in parallel depends on any constraints specified in the simulation model optimizer 1120 configuration. Once the initial set of simulations completes, the distributions comparator 1110 performs a comparison of each of the new output distributions to the ground truth data and provides the resulting comparison metrics to the simulation model optimizer. If none of the metrics pass the deviation threshold, the simulation model optimizer 1120 may initiate one or more subsequent simulations, this time varying the runtime control parameters based in part on the comparison metrics and their values during the prior round of simulations. The process may repeat until a simulation generates an output distribution that leads to a comparison metric that satisfies the deviation threshold. Once a simulation is performed that generates an output distribution that matches the ground truth data within the deviation threshold, the simulation model optimizer 1120 sends a request to the MCSS 130 to create a new template with the optimized input parameters as indicated at circle I, and the MCSS 130 creates a new template in the template data store 220 as indicated at circle J (as described above with reference to FIG. 2). When multiple simulations satisfy the deviation threshold, the simulation model optimizer 1120 may select the set of optimized input parameters that best fit the simulation to the ground truth data source (e.g., with the largest margin relative to the deviation threshold).

In some embodiments, the deviation threshold for the distributions comparator 1110 may be specified with a relative rather than an absolute value. For example, if the distribution in the output distribution data store 415 and the distribution in the buffer data store 1105 are Gaussian, a deviation threshold may be a relative variation in the mean and/or variance of the two distributions (e.g., a delta of 1% or more in the mean or variation of the distributions triggers a deviation detection). In this manner, the distributions comparator 1110 may continue to monitor the optimized Monte Carlo simulation pipeline, comparing the latest output distribution in the output distributions data store 415 generated based on the optimized template to the newest data in the buffer data store 1105. In some embodiments, the distributions comparator 1110 reconfigures with the location of the optimized output data distributions and the optimized template identifier after detecting a deviation and the subsequent optimization.

In some embodiments, the MCSS 130 notifies users attempting to perform a simulation based on a template that an optimized template exists that better matches the ground truth data. For example, after the MCSS 130 creates a new optimized template (circle J) based on an existing template identifier (circles D-H), the MCSS 130 responds to subsequent calls from other electronic devices to perform simulations based on the existing template identifier with a message indicating that the template identified for simulation has been optimized and the identity of the new template.

In some embodiments, the simulation model optimizer 1120 initiates notifications via the notifications service 1015. Such notifications may be sent via one or more communications mediums, such as error notifications routed via an internal notification service to the customer account associated with the provider network 100 or via external mediums such as email, short message service, etc. Exemplary notifications include a message indicating that the simulation model optimizer 1120 has initiated an optimization, a message identifying the original comparison metric, the optimized comparison metric, and/or any intermediate comparison metrics, a message identifying the optimized template, or a message indicating that the optimizer failed to identify an improved simulation model.

Although illustrated separately in FIG. 11, the distributions comparator 1110 and/or the simulation model optimizer 1120 may be part of the MCSS 130 in some embodiments, and the configuration of the distributions comparator 1010 is handled via an API associated with the MCSS 130. In such cases, the MCSS 130 may provide a selection of comparison techniques (e.g., KL divergence, KS test, etc.) and/or optimization techniques (grid search, etc.), or allow the user to specify a location of code for performing the comparison and/or optimization, as was the case for the data ingestion, simulation, and analysis code. In other embodiments, the distributions comparator 1110 and/or the simulation model optimizer 1120 are compute nodes within the provider network 100 (e.g., configured via the hardware virtualization service 110) or one or more electronic devices that are outside of the provider network 100, such as an electronic device that is part of the customer's network. In these embodiments, the user configures the distributions comparator 1110 and/or simulation model optimizer 1120, which interact with the MCSS 130 via an API to create or modify simulation templates, initiate simulations, etc.

In some embodiments, the techniques illustrated in FIGS. 10 and 11 are employed on the same reproducible simulation pipeline to monitor for changes in either the input distributions or output distributions relative to data sources.

Figure 12:
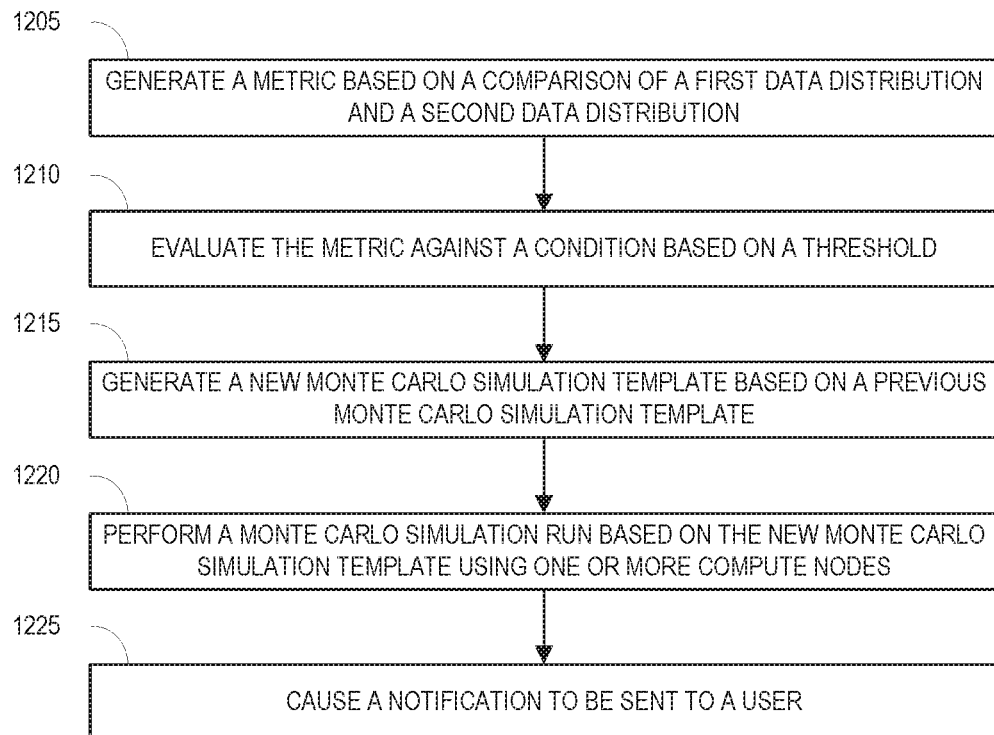
FIG. 12 is a flow diagram depicting Monte Carlo simulation monitoring operations in a reproducible Monte Carlo simulation pipeline, according to some embodiments.

FIG. 12 is a flow diagram depicting Monte Carlo simulation monitoring operations in a reproducible Monte Carlo simulation pipeline, according to some embodiments. Some or all of the operations illustrated in FIG. 12 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations illustrated in FIG. 12 are performed by a combination of the distributions comparator 1010 and the MCSS 130 in FIG. 10, or a combination of the distributions comparator 1110, the simulation model optimizer 1120, and the MCSS 130 in FIG. 11.

At block 1205, the operations include generating a metric based on a comparison of a first data distribution and a second data distribution. In some embodiments, one of the data distributions is a collection of historical values that are sampled in Monte Carlo simulation runs based on a template and the other data distribution is an input distribution from a data source providing more recent input values. In other embodiments, one of the data distributions is an output distribution from a Monte Carlo simulation run based on a template and the other data distribution is a collection of values from a ground truth data source. The metric provides a measure of the difference or similarity between the two distributions (e.g., differences in point estimates, a metric from a KL divergence comparison or a KS test comparison, etc.). At block 1210, the operations include evaluating the metric against a condition based on a threshold. For example, if the comparison technique generates a metric between zero and one where a zero value indicates the two distributions are very similar or identical and a one value indicates the two distributions are very different, a condition might require that the metric be less than or equal to a deviation threshold, such as 0.1. At block 1215, the operations include generating a new Monte Carlo simulation template based on a previous Monte Carlo simulation template, such as the Monte Carlo simulation template that was used to perform the simulation that sampled or generated one of the input distributions used in the comparison at operation 1205. At block 1220, the operations include performing a Monte Carlo simulation run based on the new Monte Carlo simulation template using one or more compute nodes, as was described above with reference to FIG. 4. At block 1225, the operations include causing a notification to be sent to a user. The notification or a message to instruct a notifications service 1015 may be sent by the MCSS 130, the distributions comparator 1010 or the distributions comparator 1110.

Figure 13:
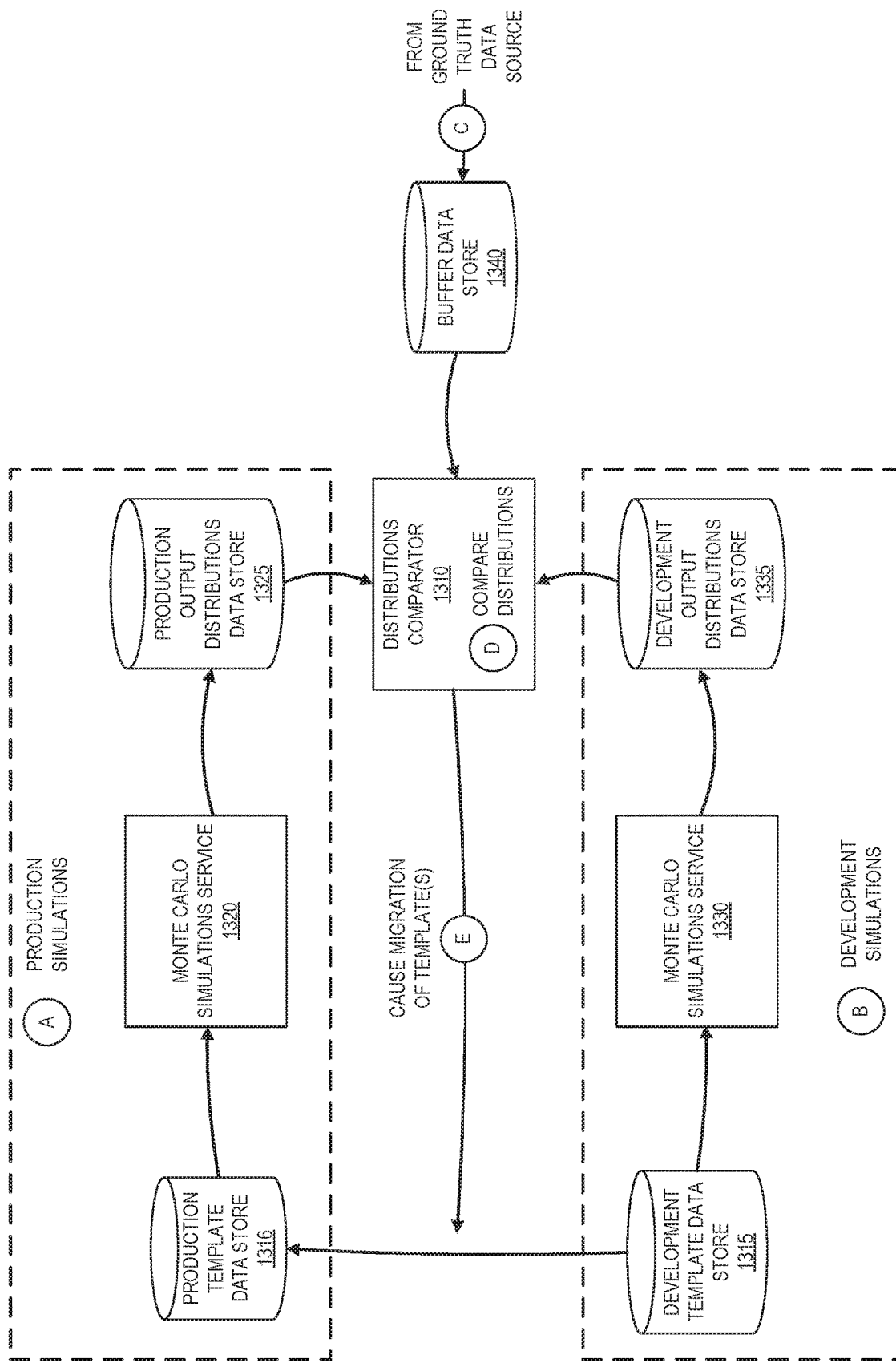
FIG. 13 is a block diagram illustrating deploying development Monte Carlo simulations into production, according to some embodiments.

FIG. 13 is a block diagram illustrating deploying development Monte Carlo simulations into production, according to some embodiments. In this embodiment, a user can develop new or improved simulation pipelines in isolation from a production environment in which simulations may be being performed by other users. In this example, one or more production simulations are performed by an MCSS 1320 based on templates stored in a production template data store 1316 and generating output distributions stored in a production output distributions data store 1325, as indicated by circle A. Also, one or more development simulations are performed by an MCSS 1330 based on templates stored in a development template data store 1315 and generating output distributions stored in a development output distributions data store 1335, as indicated by circle B. As indicated at circle C, a ground data source feeds a buffer data store 1340 that aggregates data from the data source. A distributions comparator 1310 compares output distributions from the production pipeline to output distributions from the development pipeline, as indicated by circle D. If the performance of a development template based on a production template exceeds the performance of the production simulations for the template, the distributions comparator 1310 causes the development template to be migrated from the development template data store 1315 to the production template data store 1316, as indicated by circle E.

Figure 14:
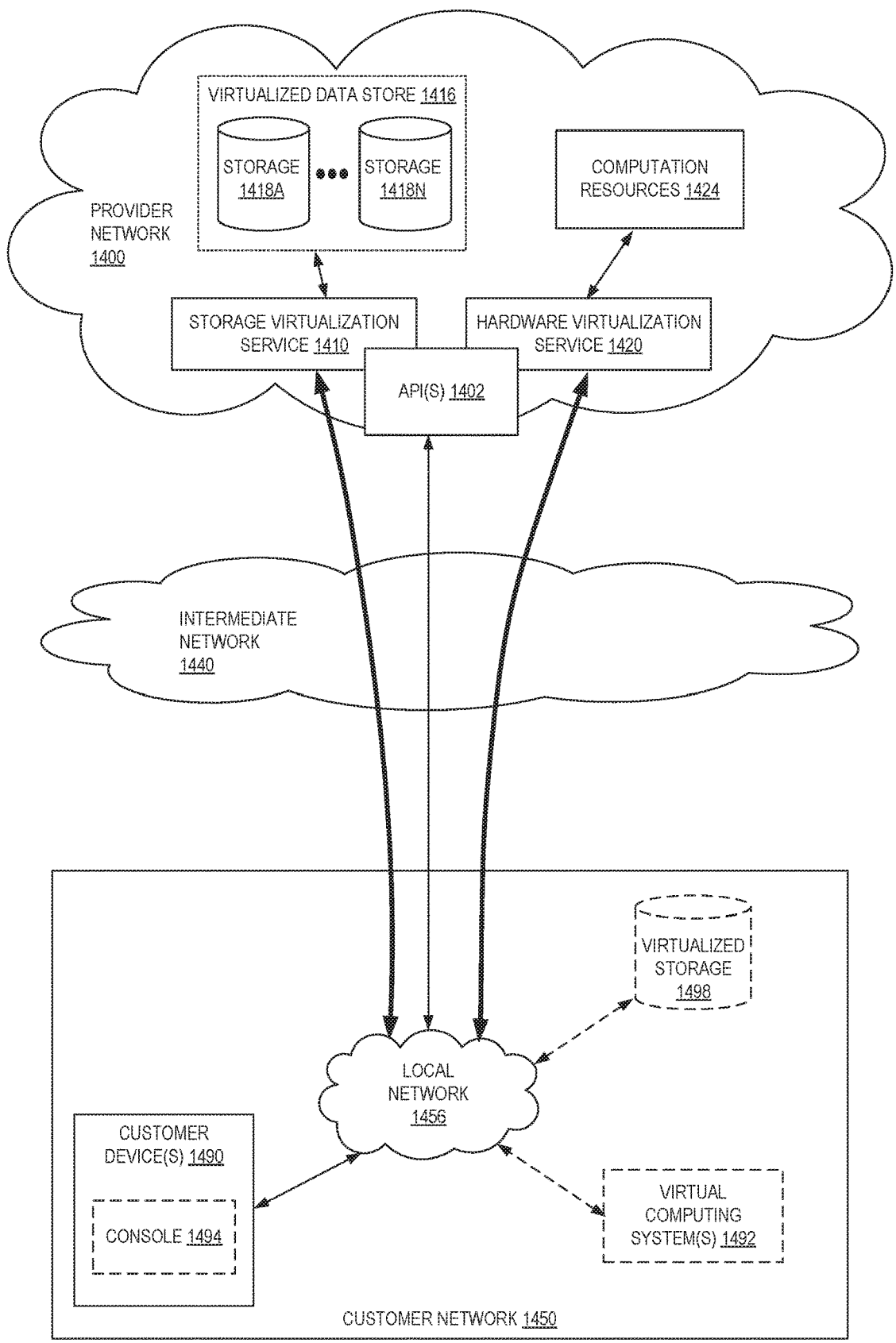
FIG. 14 is a block diagram of an example provider network that provides a storage virtualization service and a hardware virtualization service to customers according to some embodiments.

FIG. 14 is a block diagram of an example provider network that provides a storage virtualization service and a hardware virtualization service to customers, according to some embodiments. Hardware virtualization service 1420 provides multiple computation resources 1424 (e.g., VMs) to customers. The computation resources 1424 may, for example, be rented or leased to customers of the provider network 1400 (e.g., to a customer that implements customer network 1450). Each computation resource 1424 may be provided with one or more local IP addresses. Provider network 1400 may be configured to route packets from the local IP addresses of the computation resources 1424 to public Internet destinations, and from public Internet sources to the local IP addresses of computation resources 1424.

Provider network 1400 may provide a customer network 1450, for example coupled to intermediate network 1440 via local network 1456, the ability to implement virtual computing systems 1492 via hardware virtualization service 1420 coupled to intermediate network 1440 and to provider network 1400. In some embodiments, hardware virtualization service 1420 may provide one or more APIs 1402, for example a web services interface, via which a customer network 1450 may access functionality provided by the hardware virtualization service 1420, for example via a console 1494 (e.g., a web-based application, standalone application, mobile application, etc.). In some embodiments, at the provider network 1400, each virtual computing system 1492 at customer network 1450 may correspond to a computation resource 1424 that is leased, rented, or otherwise provided to customer network 1450.

From an instance of a virtual computing system 1492 and/or another customer device 1490 (e.g., via console 1494), the customer may access the functionality of storage virtualization service 1410, for example via one or more APIs 1402, to access data from and store data to storage resources 1418A-1418N of a virtual data store 1416 provided by the provider network 1400. In some embodiments, a virtualized data store gateway (not shown) may be provided at the customer network 1450 that may locally cache at least some data, for example frequently accessed or critical data, and that may communicate with virtualized data store service 1410 via one or more communications channels to upload new or modified data from a local cache so that the primary store of data (virtualized data store 1416) is maintained. In some embodiments, a user, via a virtual computing system 1492 and/or on another customer device 1490, may mount and access virtual data store 1416 volumes, which appear to the user as local virtualized storage 1498.

While not shown in FIG. 14, the virtualization service(s) may also be accessed from resource instances within the provider network 1400 via API(s) 1402. For example, a customer, appliance service provider, or other entity may access a virtualization service from within a respective virtual network on the provider network 1400 via an API 1402 to request allocation of one or more resource instances within the virtual network or within another virtual network.

Figure 15:
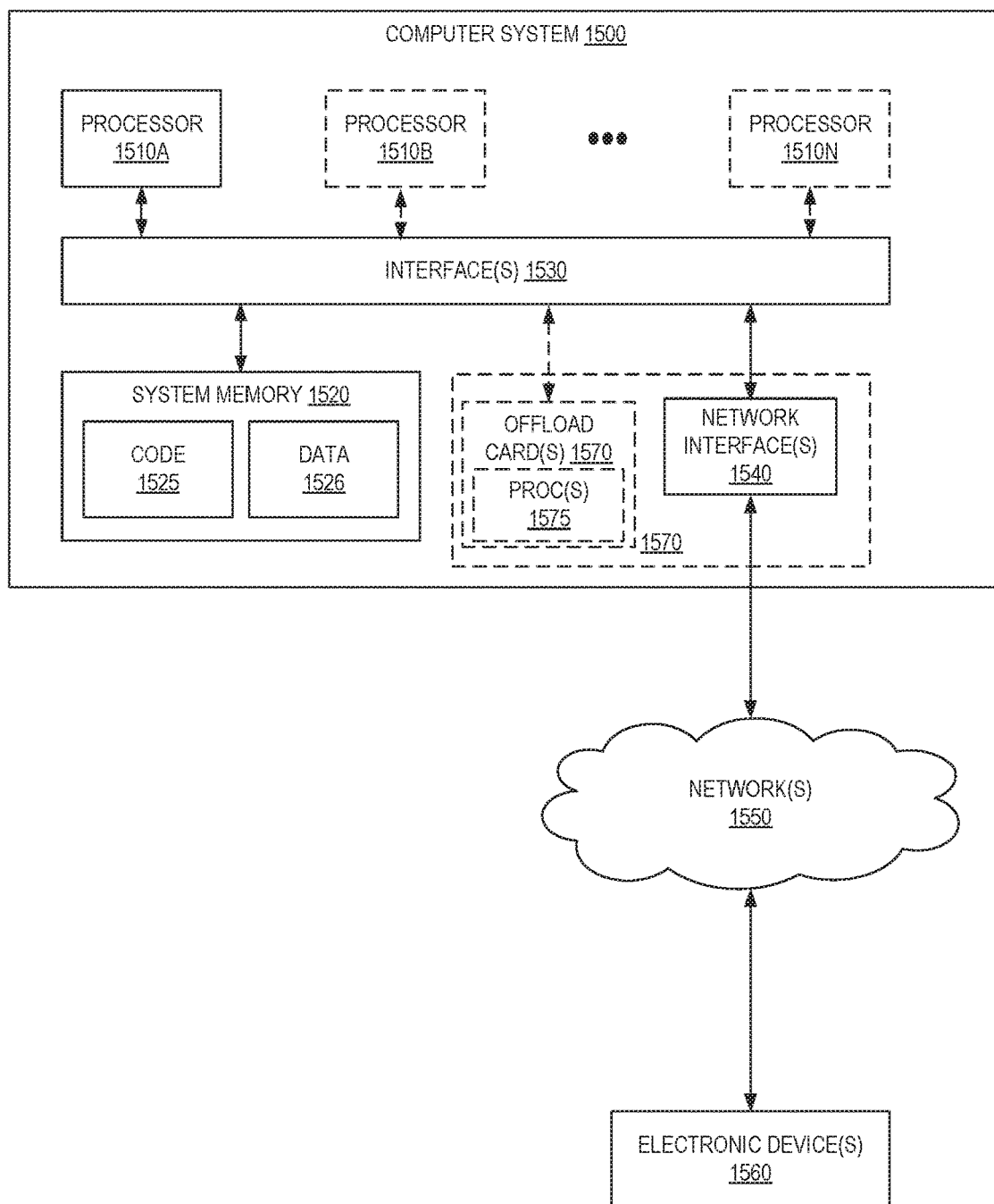
FIG. 15 is a block diagram illustrating an example computer system that may be used in some embodiments.

In some embodiments, a system that implements a portion or all of the phases of the Monte Carlo simulation pipeline as described herein may include a general-purpose computer system that includes or is configured to access one or more computer-accessible media, such as computer system 1500 illustrated in FIG. 15. In the illustrated embodiment, computer system 1500 includes one or more processors 1510 coupled to a system memory 1520 via an input/output (I/O) interface 1530. Computer system 1500 further includes a network interface 1540 coupled to I/O interface 1530. While FIG. 15 shows computer system 1500 as a single computing device, in various embodiments a computer system 1500 may include one computing device or any number of computing devices configured to work together as a single computer system 1500.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1510 may commonly, but not necessarily, implement the same ISA.

System memory 1520 may store instructions and data accessible by processor(s) 1510. In various embodiments, system memory 1520 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for performing Monte Carlo simulations in provider network environments, are shown stored within system memory 1520 as code 1525 and data 1526.

In the present disclosure, "code" may refer to any instructions that can be executed by a computer that are stored in a human- and/or machine-readable format. For example, code includes source code (e.g., source code representing a program, routines, subroutines, threads, and so forth) written in a programming language and machine code (e.g., instructions that can be executed by a computer). Code may be written in any language, including Java, JavaScript, Python, C#, Ruby, etc. For code written in some programming languages, a compiler is typically used to derive machine code from the source code—a form consisting of instructions that a computing device can directly execute. The machine code can also be stored for execution at a later time (for example, as an executable file). Alternatively, for code written in other programming languages, an interpreter can be used to execute the code directly without compiling the source code into a separate executable program. Thus, references herein to execution of code can refer to any of execution of an executable program derived from the source code, execution of the source code directly, or other execution strategies depending on a particular programming language, build and deploy environment, execution environment used, and so forth.

In one embodiment, I/O interface 1530 may be configured to coordinate I/O traffic between processor 1510, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices 1560 attached to a network or networks 1550, such as other computer systems or devices as illustrated in FIG. 1, for example. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1500 includes one or more offload cards 1570 (including one or more processors 1575, and possibly including the one or more network interfaces 1540) that are connected using an I/O interface 1530 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1500 may act as a host electronic device (e.g., operating as part of a hardware virtualization service) that hosts compute instances, and the one or more offload cards 1570 execute a virtualization manager that can manage compute instances that execute on the host electronic device. As an example, in some embodiments the offload card(s) 1570 can perform compute instance management operations such as pausing and/or un-pausing compute instances, launching and/or terminating compute instances, performing memory transfer/copying operations, etc. These management operations may, in some embodiments, be performed by the offload card(s) 1570 in coordination with a hypervisor (e.g., upon a request from a hypervisor) that is executed by the other processors 1510A-1510N of the computer system 1500. However, in some embodiments the virtualization manager implemented by the offload card(s) 1570 can accommodate requests from other entities (e.g., from compute instances themselves), and may not coordinate with (or service) any separate hypervisor.

In some embodiments, system memory 1520 may be one embodiment of a computer-accessible medium configured to store program instructions and data as described above.

However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1500 via I/O interface 1530. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a user-initiated request to perform a Monte Carlo simulation within a provider network, the request specifying a template that identifies a plurality of input parameters to the Monte Carlo simulation the template identifying at least one configurable input parameter and a seed value for a pseudorandom number generator, the template stored in a template data store;
   performing the Monte Carlo simulation using one or more virtual machines (VMs), each of the one or more VMs performing a portion of the Monte Carlo simulation, wherein the performing comprises:
      sampling a plurality of input values from an input data distribution stored in a first data store at a first provider network location specified in the template,
      processing the plurality of input values with a first input parameter identified in the template to generate a plurality of output values, and
      storing the plurality of output values in a second data store at a second provider network location specified in the template, the plurality of output values forming an output data distribution;
   generating a statistic of the output data distribution; and
   sending the statistic to an electronic device that originated the request, the electronic device to display the statistic via a user interface.

2. The computer-implemented method of claim 1, wherein the Monte Carlo simulation comprises a batch of simulation runs and a first VM within the one or more VMs performs a first simulation run within the batch and a second VM within the one or more VMs performs a second simulation run within the batch.

3. The computer-implemented method of claim 1, wherein the template identifies one or more runtime parameters that are received with the request, and the first input parameter is a runtime parameter received with the request.

4. A computer-implemented method comprising:
   receiving a user-initiated request to perform a Monte Carlo simulation within a provider network, the request specifying a template that identifies a plurality of input parameters to the Monte Carlo simulation, the template identifying at least one configurable input parameter, the template stored in a template data store;
   performing the Monte Carlo simulation using a number of compute nodes, wherein the number is based on a first input parameter specified by the template, each of the number of compute nodes performing a portion of the Monte Carlo simulation to generate an output data distribution;
   generating a statistic of the output data distribution; and
   sending the statistic to an electronic device to be displayed via a user interface.

5. The computer-implemented method of claim 4, wherein the template specifies a location and a version of simulation code to perform the Monte Carlo simulation.

6. The computer-implemented method of claim 4, wherein the template is maintained by the provider network in a version-controlled data store.

7. The computer-implemented method of claim 4, wherein the Monte Carlo simulation comprises a batch of simulation runs and a first compute node within the number of compute nodes performs a first simulation run within the batch and a second compute node within the number compute nodes performs a second simulation run within the batch.

8. The computer-implemented method of claim 4, wherein the receiving the request and the sending the statistic use HyperText Transfer Protocol messages.

9. The computer-implemented method of claim 4, wherein the performing the portion of the Monte Carlo simulation to generate the output data distribution comprises:
   sampling a first plurality of input values from an empirical input data distribution stored in a first data store at a first provider network location specified in the template;
   sampling a second plurality of input values from a parametric distribution defined by one or more parametric input distribution parameters specified in the template;
   processing the first plurality of input values or the second plurality of input values with a second input parameter identified in the template to generate a plurality of output values; and
   storing the plurality of output values in a second data store at a second provider network location specified in the template, the plurality of output values forming the output data distribution.

10. The computer-implemented method of claim 9, wherein the template identifies one or more runtime parameters that are received with the request, and the second input parameter is a runtime parameter received with the request.

11. The computer-implemented method of claim 9, wherein the sampling comprises randomly sampling each input value in the first plurality of input values from the empirical input data distribution based on a random number generated using a seed value specified in the template.

12. The computer-implemented method of claim 4, further comprising sending a status indicator to the electronic device prior to generating the statistic.

13. A system comprising:
   a first one or more electronic devices within a provider network to implement a web service, the first one or more electronic devices comprising at least a first processor, the web service including instructions that upon execution cause the first one or more electronic devices to:
      receive a user-initiated request to perform a Monte Carlo simulation within the provider network, the request identifying a template and including one or more runtime parameters associated with the template, the template identifying at least one configurable input parameter, the template to be retrieved from a template data store;
      issue a command to perform a Monte Carlo simulation, the command identifying the template and including the one or more runtime parameters; and a second one or more electronic devices to implement a Monte Carlo simulation service, the second one or more electronic devices comprising at least a second processor, the Monte Carlo simulation service including instructions that upon execution cause the second one or more electronic devices to:
  receive the command identifying the template and including the one or more runtime parameters;
  cause the Monte Carlo simulation to be performed via use of one or more compute nodes based on a first input parameter specified in the template, each of the one or more compute nodes to perform a portion of the Monte Carlo simulation using at least one of the one or more runtime parameters to generate an output data distribution;
  generate a statistic of the output data distribution; and
  send the statistic to an electronic device to be displayed via a user interface.

14. The system of claim 13, wherein the first input parameter is a location and a version of simulation code to perform the Monte Carlo simulation.

15. The system of claim 13, wherein the template is maintained by the provider network in a version-controlled data store.

16. The system of claim 13, wherein the Monte Carlo simulation comprises a batch of simulation runs and a first compute node within the one or more compute nodes is to perform a first simulation run within the batch and a second compute node within the one or more compute nodes is to perform a second simulation run within the batch.

17. The system of claim 13, wherein the received request and the sent statistic comprise HyperText Transfer Protocol messages.

18. The system of claim 13, wherein the second one or more electronic devices are further to send a status indicator to the electronic device.

19. The system of claim 13, wherein the first one or more electronic devices are further to send web page data including a plurality of template identifications, the plurality of template identifications including an identification of the template identified in the request.

20. The system of claim 13, wherein the first one or more electronic devices are further to send web page data including an identification of the one or more runtime parameters to the electronic device.

\* \* \* \* \*